US012668370B2

(12) United States Patent
Richter et al.

(10) Patent No.: US 12,668,370 B2
(45) Date of Patent: Jun. 30, 2026

(54) FLIGHT CONTROL SYSTEMS USING INTERCONNECTED COMMAND PROCESSORS

(71) Applicant: Beta Air, LLC, South Burlington, VT (US)

(72) Inventors: Timothy Gerard Richter, Jeffersonville, VT (US); Tyler Arsenault, Cambridge, VT (US)

(73) Assignee: BETA AIR LLC, South Burlington, VT (US)

( * ) Notice: Subject to any disclaimer, the term of this patent is extended or adjusted under 35 U.S.C. 154(b) by 103 days.

(21) Appl. No.: 18/593,776

(22) Filed: Mar. 1, 2024

(65) Prior Publication Data

US 2025/0276799 A1     Sep. 4, 2025

(51) Int. Cl.
*B64D 31/04*         (2006.01)
*B64D 31/16*         (2024.01)

(52) U.S. Cl.
CPC ............. *B64D 31/04* (2013.01); *B64D 31/16* (2024.01)

(58) Field of Classification Search
CPC ................................ B64D 31/04; B64D 31/16
See application file for complete search history.

(56) References Cited

U.S. PATENT DOCUMENTS

| | | | |
|---|---|---|---|
| 6,330,483 B1 | 12/2001 | Dailey | |
| 8,185,255 B2 | 5/2012 | Lavretsky et al. | |
| 8,453,160 B2 | 5/2013 | Sunderland et al. | |
| 11,820,492 B1 | 11/2023 | Shaw | |
| 2006/0100750 A1* | 5/2006 | Platzer | G05D 1/0077 |
| | | | 701/3 |
| 2012/0175198 A1* | 7/2012 | Thibault | H02K 11/21 |
| | | | 188/158 |

(Continued)

FOREIGN PATENT DOCUMENTS

| | | |
|---|---|---|
| CN | 104122896 B | 3/2017 |
| CN | 206481103 U | 9/2017 |
| CN | 109799696 A | 5/2019 |

OTHER PUBLICATIONS

IEEE—Triple-Triple Redundant 777 Primary Flight Computer—Y. C. (Bob) Yeh Boeing Commercial Airplane Group (Year: 1996).*

(Continued)

*Primary Examiner* — Donald J Wallace
*Assistant Examiner* — Jalal C Coduroglu
(74) *Attorney, Agent, or Firm* — Lee & Hayes, P.C.

(57)                ABSTRACT

Techniques for controlling the operation of a component of an aircraft, such as an inverter used to provide electric energy to the aircraft's motor or an actuator used to control positioning of a control surface (e.g., an aileron, an elevator, a rudder, and/or the like) of the aircraft. In example embodiments, a command processor receives a first command pilot signal generated by a first flight controller component from the first flight controller component. The command processor receives a second command pilot signal generated by a second flight controller component from another command processor. The command processor may determine a consolidated command signal based on the two command signals. The command processor may control the operation of the component of the aircraft based on the consolidated command signal.

24 Claims, 8 Drawing Sheets

100 ➙

(56)            References Cited

U.S. PATENT DOCUMENTS

| | | | | |
|---|---|---|---|---|
| 2014/0100718 | A1* | 4/2014 | Brot | B64C 19/00 |
| | | | | 701/3 |
| 2016/0032866 | A1 | 2/2016 | Cameron | |
| 2017/0355449 | A1 | 12/2017 | Bapat et al. | |
| 2018/0244374 | A1* | 8/2018 | Pierra | B64C 25/20 |
| 2018/0362149 | A1* | 12/2018 | Huynh | B64C 13/42 |
| 2019/0155282 | A1* | 5/2019 | Kim | B64C 27/57 |
| 2019/0220004 | A1* | 7/2019 | Von Novak, III | B63H 21/21 |
| 2020/0047873 | A1* | 2/2020 | Huynh | B64C 9/20 |
| 2020/0110523 | A1* | 4/2020 | Urbanski | G08G 5/32 |
| 2020/0262544 | A1 | 8/2020 | Wilkens | |
| 2021/0171187 | A1* | 6/2021 | Keir | B64C 19/00 |
| 2022/0227483 | A1 | 7/2022 | Scanlan et al. | |
| 2022/0266988 | A1* | 8/2022 | Richter | B64D 31/04 |
| 2022/0274695 | A1 | 9/2022 | Moore et al. | |
| 2022/0350347 | A1 | 11/2022 | Hagerott et al. | |
| 2023/0322366 | A1* | 10/2023 | De Castro Paiva | G05D 1/102 |
| | | | | 701/3 |
| 2024/0061445 | A1* | 2/2024 | Moy | B64C 9/02 |
| 2024/0126259 | A1* | 4/2024 | Juhrig | G05D 1/0077 |
| 2025/0187722 | A1* | 6/2025 | Peters | G05D 1/87 |

OTHER PUBLICATIONS

ICAS2005—Airbus Fly-By-Wire: a Process Toward Total Dependability Pascal Traverse, Isabelle Lacaze, Jean Souyris (Year: 2006).*
Search Report and Written Opinion for International Application No. PCT/US25/15743, Dated Dec. 10, 2025, 17 pages.

* cited by examiner

100 ⟍

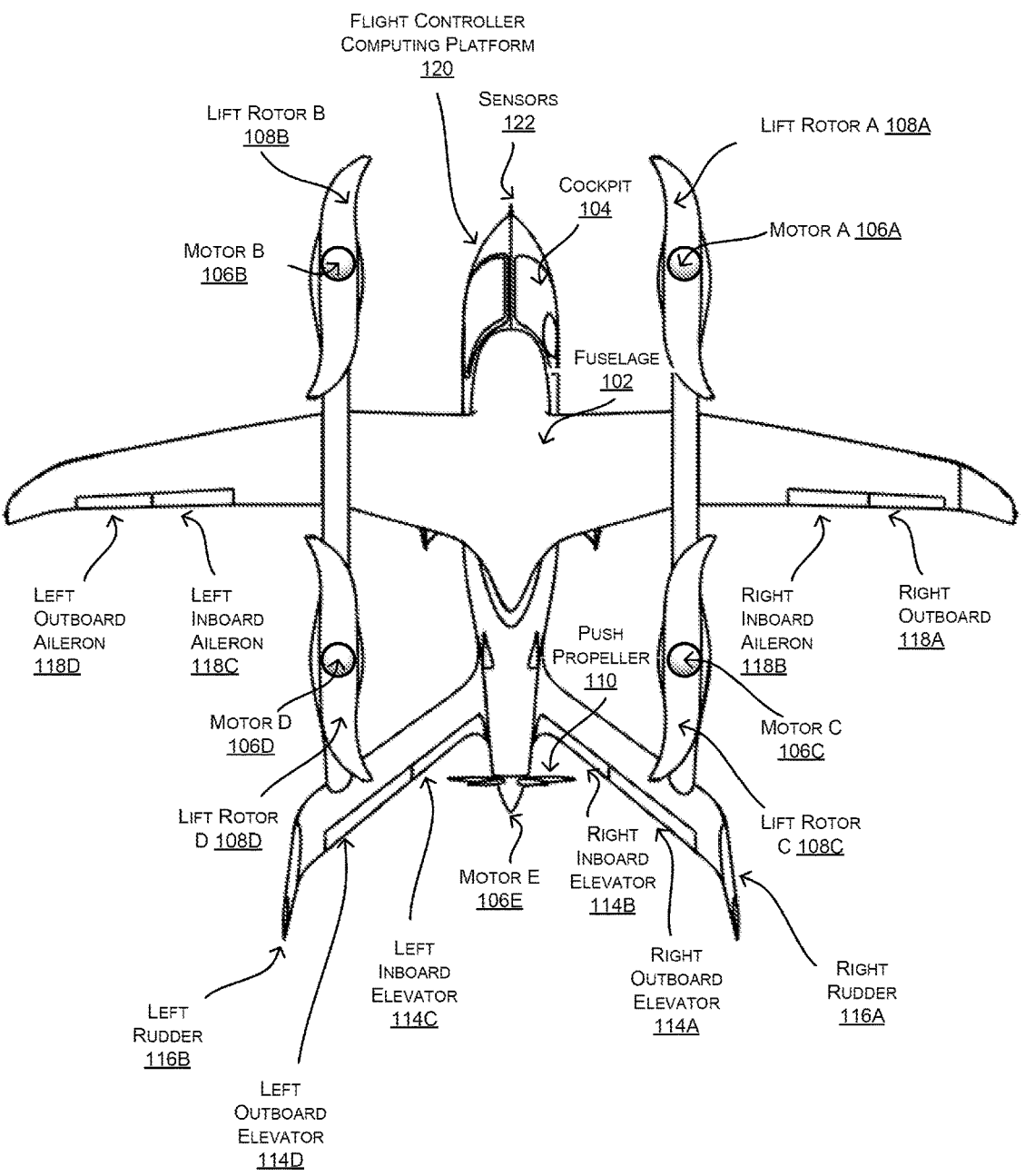

FLIGHT CONTROLLER
COMPUTING PLATFORM
120

SENSORS
122

COCKPIT
104

LIFT ROTOR B
108B

LIFT ROTOR A 108A

MOTOR B
106B

MOTOR A 106A

FUSELAGE
102

LEFT
OUTBOARD
AILERON
118D

LEFT
INBOARD
AILERON
118C

RIGHT
INBOARD
AILERON
118B

RIGHT
OUTBOARD
118A

PUSH
PROPELLER
110

MOTOR D
106D

MOTOR C
106C

LIFT ROTOR
D 108D

LIFT ROTOR
C 108C

RIGHT
INBOARD
ELEVATOR
114B

MOTOR E
106E

LEFT
RUDDER
116B

LEFT
INBOARD
ELEVATOR
114C

RIGHT
OUTBOARD
ELEVATOR
114A

RIGHT
RUDDER
116A

LEFT
OUTBOARD
ELEVATOR
114D

FOR EACH COMMAND SIGNAL, GENERATE A VOTING SCORE
602

DETERMINE THE COMMAND SIGNAL WITH THE HIGHEST VOTING SCORE
604

GENERATE THE CONSOLIDATED COMMAND
606

508A

FLIGHT CONTROL SYSTEMS USING INTERCONNECTED COMMAND PROCESSORS

TECHNICAL FIELD

The present application relates to the field of flight control systems, and more specifically to flight control systems using interconnected command processors.

BACKGROUND

Aircraft flight control systems perform the critical function of converting pilot inputs into control signals for various components and surfaces of an aircraft. Reliable and responsive flight control is important for proper functioning and safety of the aircraft during flight operations. Many aircraft systems today utilize fly-by-wire control systems to translate pilot inputs into signals that control the aircraft.

SUMMARY

In one aspect, the techniques described herein relate to a flight control system for an aircraft. The flight controller system comprises a first flight controller configured to receive a pilot control input to one or more pilot control devices of the aircraft. The first flight controller is further configured to generate, based on the pilot control input, a first pilot command signal for controlling a first component of the aircraft. The system further comprises a first command processor configured to: receive the first pilot command signal from a first flight controller. The first flight controller is further configured to receive, from a second processor, a second pilot command signal for controlling the first component, the second pilot command signal generated by a second flight controller based on the pilot control input. The first flight controller is further configured to generate, based on the first pilot command signal and the second pilot command signal, a consolidated pilot command signal to control the first component of the aircraft.

In another aspect, the techniques described herein relate to a flight control system for an aircraft. The flight control system comprises a first command processor configured to receive, from a first flight controller, a first pilot command signal for controlling a first component of the aircraft, the first pilot command signal generated based on pilot control input to one or more pilot control devices of the aircraft. The first command processor is further configured to receive, from a second flight controller, a second pilot command signal for controlling the first component, the second pilot command signal generated based on the pilot control input. The first command processor is further configured to receive, from a second processor, a third pilot command signal for controlling the first component, the third pilot command signal generated based on the pilot control input. The first command processor is further configured to generate, based on the first through third pilot command signals, a consolidated pilot command signal to control the first component of the aircraft. The flight control system further comprises the second processor. The second processor is configured to receive the third pilot command signal from a second flight controller. The second processor is further configured to provide the third pilot command signal to the first command processor to enable the first command processor to generate the consolidated pilot command signal based on the first through third pilot command signals.

The techniques described herein may further relate to a method comprising the operations associated with at least one of the flight control systems described above. The techniques may further relate to one or more non-transitory computer-readable media storing computer-executable instructions that, when executed by the processor, cause the one or more processors to perform operations associated with at least one of the flight control systems described above.

In another aspect, the techniques described herein relate to a command processor for an aircraft flight controller system. The command processor includes a first connection port. The first connection port receives, from a first flight controller, a first pilot command signal for controlling a first component of an aircraft, the first pilot command signal generated based on pilot control input to one or more pilot control devices of the aircraft. The first connection port further receives, from a second flight controller, a second pilot command signal for controlling the first component, the second pilot command signal generated based on the pilot control input. The command processor further includes a second connection port receiving, from a second processor, a third pilot command signal for controlling the first component, the third pilot command signal generated based on the pilot control input. The command processor further includes a processing component configured to generate, based on the first through third pilot command signals, a consolidated pilot command signal to control the first component of the aircraft.

The techniques described herein may further relate to a method comprising the operations associated with the command processor described above. The techniques may further relate to one or more non-transitory computer-readable media storing computer-executable instructions that, when executed by the processor, cause the one or more processors to perform operations associated with command processor described above.

These and other aspects and features of non-limiting embodiments of the present disclosure will become apparent to those skilled in the art upon review of the following description of specific non-limiting embodiments of the invention in conjunction with the accompanying drawings.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

FIG. 1 depicts an example aircraft that may be used to implement the concepts described herein.

DETAILED DESCRIPTION

Figure 2:
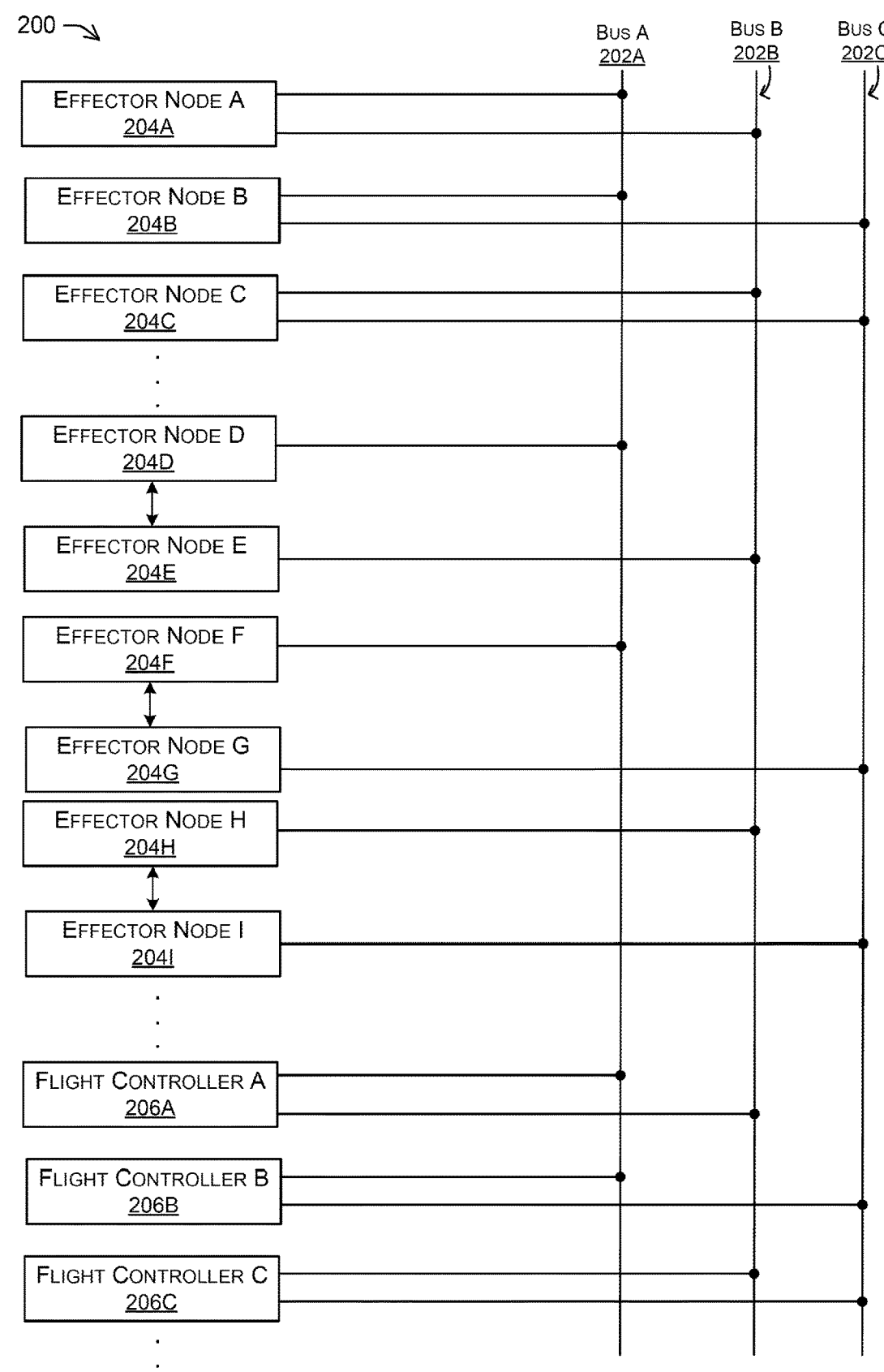
FIG. 2 depicts an example network for an aircraft with a set of network buses.

This disclosure describes techniques related to operating an aircraft, such as an electric aircraft. An example of an electric aircraft that may operate in accordance with the techniques described herein is an electric vehicle take-off and landing (eVTOL) aircraft that uses electric power to take off, hover, and/or land vertically. However, a person of ordinary skill in the relevant technology will recognize that other types of aircraft may use the techniques described herein.

In some embodiments, the techniques described herein relate to controlling the operation (e.g., an aspect of the operation) of a component of an aircraft, such as an inverter used to supply electric power to the aircraft's motor, or an actuator used to control positioning of a control surface (e.g., an aileron, an elevator, a rudder, and/or the like) of the aircraft. In accordance with some of the techniques described herein, a command processor may receive a first command pilot signal generated by a first flight controller component based on pilot control input data and a second command pilot signal generated by a second flight controller component based on the same pilot control input data. The command processor may determine a consolidated command signal based on the two command signals. The command processor may receive the first command pilot signal directly from the first flight controller component and the second command pilot signal from a second command processor. The second command processor may have previously received the second command pilot signal from the second flight controller component.

For example, three flight controller components may receive the same pilot input data. A first flight controller component of the three flight controller components may process the pilot input data to determine a first command signal and provide the first command signal to a first command processor. A second flight controller component of the three flight controller components may process the pilot input data to determine a second command signal and provide the second command signal to the first command processor and a second command processor. A third flight controller component of the three flight controller components may process the pilot input data to determine a third command signal and provide the third command signal to the second command processor. The first command processor may then provide the first command signal to the second command processor, and the second command processor may provide the second command signal to the first command processor. The first command processor may then determine a first consolidated command signal based on the first, second, and third command signals. Similarly, the second command processor may determine a second consolidated command signal based on the first, second, and third command signals.

In some embodiments, an example system may use two or more consolidated command signals generated by two or more command processors to control the operation of an aircraft component. For example, in some embodiments, the system may control a first aspect of the operation of the aircraft component (e.g., a first electric power load required by an inverter) based on the first consolidated command signal and a second aspect of the operation of the aircraft component (e.g., a second electric power load required by the inverter) based on the second consolidated command signal. As another example, in some embodiments, the system may control the operation of the aircraft component (e.g., the position of a control surface actuator) based on the first consolidated command signal based on determining a monitoring signal which indicates that the first consolidated command signal is valid. The monitoring signal may permit or deny controlling of the aircraft component based on the first consolidated command signal. The monitoring signal may be determined based on (e.g., based on a comparison of) the first consolidated command signal and the second consolidated command signal. For example, the monitoring signal may indicate whether the deviation between the two consolidated command signals falls below a threshold, whether the first consolidated command signal is the same as the second consolidated command signal, and/or the like.

Accordingly, the techniques described herein enable two or more command processors to each receive a first segment from a set of command signals directly from a set of flight controller components, a second segment from the set of command signals from other command processors, and determine a consolidated command signal based on these two segments. This arrangement may be advantageous because it reduces the number of communication links needed to enable the operation of the two or more command processors, thus reducing the weight of the aircraft and enhancing the thrust, lift, and/or operational capacity of the aircraft.

● Exemplary Aircraft Configuration

FIG. 1 depicts an example aircraft 100 on which the concepts described herein may be implemented. The aircraft 100 may be an eVTOL, for example. As depicted in FIG. 1, the aircraft 100 includes a fuselage 102, a cockpit 104, and other components described in greater detail below. In some embodiments, the aircraft 100 uses a fly-by-wire control system. In one embodiment, the aircraft 100 may be a lift and cruise aircraft capable of a wing-born and a vertical thrust flight mode, as further described below.

As depicted in FIG. 1, the aircraft may include multiple motors 106, such as motor A 106A, motor B 106B, motor C 106C, motor D 106D, and motor E 106E (five in this example). The motors 106 may be positioned to balance thrust and/or lift distribution across the aircraft 100. In some embodiments, one or more of the motors 106 may be configured for redundancy and/or failover purposes. For example, in some embodiments, if motor A 106A were to fail and/or operate at a reduced capacity, a set of other motors (e.g., motor B 106B, motor C 106C, and/or motor D 106D) may be configured to compensate for the reduced and/or lost operational capacity of motor A 106A.

A motor 106 may be configured to drive (e.g., rotate) one or more flight components 108 associated with the aircraft 100. Examples of flight components 108 include lift rotors 108A-108D and a push propeller 110. For example, motor A 106A may be configured to drive the lift rotor A 108A, motor B 106B may be configured to cause movement of the lift rotor B 108B, motor C 106C may be configured to drive the lift rotor C 108C, motor D 106D may be configured to drive the lift rotor D 108D, and motor E 106E may be configured to drive the push propeller 110. In some embodiments, lift rotors A-D 108A-D may be configured to assist in the vertical takeoff of the aircraft 100, while the push propeller 110 may be configured to assist in the horizontal movement of the aircraft. In some embodiments, differential thrust generated using the lift rotors 108A-D may enable attitude control in a vertical thrust flight mode.

One or more of the motors 106 may be an electric motor. An electric motor may be configured to convert electric energy into mechanical energy needed for the thrust and/or lift of the aircraft 100, for example by causing a flight component to move (e.g., a rotor to rotate). In some embodiments, one or more energy sources such as one or more batteries (not shown) associated with the aircraft 100 may be configured to store electric energy. For example, a battery may store direct current (DC) electric power. An inverter may convert the DC electric power stored by a battery into alternating current (AC) power and provide the AC power to one or more of the motors A-E 106A-E. Accordingly, the aircraft 100 may include one or more inverters used for providing electric power to the motors A-E 106A-E.

In some embodiments, one or more of the motors 106 of the aircraft 100 receive electric energy from a set of inverters (not shown), such as a set of inverters that are specifically reserved for DC-to-AC power conversion for one or more of the motors 106. For example, a first set of inverters (e.g., two inverters) may be positioned in an upper-right segment of the aircraft 100 to provide electric energy to motor A 106A, a second set of inverters (e.g., two inverters) may be positioned in an upper-left segment of the aircraft 100 to provide electric energy to motor B 106B, a third set of inverters (e.g., two inverters) may be positioned in a middle-right segment of the aircraft 100 to provide electric energy to motor C 106C, a fourth set of inverters (e.g., two inverters) may be positioned in a middle-left segment of the aircraft 100 to provide electric energy to motor D 106D, and/or a fifth set of inverters (e.g., one inverter) may be positioned in a tail segment of the aircraft 100 to provide electric energy to motor E 106E. In some embodiments, a set of inverter nodes control the operation of one or more inverters of the aircraft 100.

As further depicted in FIG. 1, the aircraft 100 includes a set of control surfaces 114-118, such as a set of elevators 114, a set of rudders 116, a set of ailerons 118, a vertical stabilizer, and/or the like. A control surface 114-118 may be a movable surface that, when deflected into the airstream, exerts an aerodynamic force and causes the aircraft 100 to rotate around an axis. For example, the elevators 114 may control pitch, the rudders 116 may control yaw, and the ailerons 118 may control roll of the aircraft 100. In some embodiments, the control surfaces 114-118 are used for attitude control in a wing-born mode.

Each of the control surfaces 114-118 may be controlled using one or more actuators (not shown). In some embodiments, a single actuator may control the operation of a control surface 114-118. As another example, in some embodiments, a first actuator may control the operation of a control surface 114-118, while a second actuator may control the operation of the same control surface 114-118 if a computing device that controls the second actuator detects that the first actuator has failed and/or is disabled. As another example, in some embodiments, two or more actuators may collectively control the operation of a control surface 114-118. Example techniques for using actuators to control operation of a control surface 114-118 of the aircraft 100 are described in U.S. Patent App. Pub. No. 2023/005406C1, filed on Jun. 30, 2022 and entitled "Systems and Methods for Redundant Flight Control in an Aircraft," which is incorporated by reference herein in its entirety and for all purposes.

As depicted in FIG. 1, the control surfaces 114-118 of the aircraft 100 may include a set of elevators 114 configured to control the pitch of the aircraft 100. The elevators 114 may include a right outboard elevator 114A, a right inboard elevator 114B, a left inboard elevator 114C, and a left outboard elevator 114D. Accordingly, in some embodiments, the elevators 114 on both sides of the aircraft 100 may be partitioned into two or more components. This may enable one of the following: (i) to provide more precise control over the pitch of the aircraft 100, and/or (ii) to provide redundancy in the event of component failure. For example, in some embodiments, having two or more elevator components on each side enables independently controlling those components to enable more fine-tuned control over the pitch of the aircraft 100. As another example, in some embodiments, in the event of failure of a first elevator component on one side, a second elevator component on the same side may enable control of the pitch of the aircraft on that side to mitigate the failure The control surfaces 114-118 of the aircraft 100 may also include a set of rudders 116 configured to control yaw of the aircraft 100. The rudders 116 may include a right rudder 116A and a left rudder 116B. Unlike the elevators 114, the rudders 116 of the aircraft 100 are not depicted as partitioned on two sides. However, a person of ordinary skill in the relevant technology will recognize that, in some airframe embodiments, the rudders of an aircraft may be partitioned on one or both sides. For example, the rudders of an aircraft may include a right outboard rudder, a right inboard rudder, a left inboard rudder, and a left outboard rudder. Alternatively, a single rudder or multiple rudders may be partitioned into vertical sections.

The control surfaces 114-118 of the aircraft 100 may also include a set of ailerons 118 configured to control the roll of the aircraft 100. For example, the ailerons 118 may include a right outboard aileron 118A, a right inboard aileron 118B, a left inboard aileron 118C, and a left outboard aileron 118D. Accordingly, in some embodiments, the ailerons 118 on both sides of the aircraft 100 may be partitioned into two or more components. This may enable at least one of the following: (i) to provide more precise control over the roll of the aircraft, or (ii) to provide redundancy in the event of component failure. For example, in some embodiments, having two or more aileron components on each side enables independently controlling those components to enable more fine-tuned control over the roll of the aircraft 100. As another example, in some embodiments, in the event of failure of a first aileron on one side, a second aileron component on the same side may enable control of the roll of the aircraft on that side to mitigate the failure.

As further depicted in FIG. 1, the aircraft 100 includes a flight controller computing platform 120. The flight controller computing platform 120 may include one or more flight controller components (e.g., one or more flight control computers (FCCs)) configured to generate command signal(s) that control the operation of at least one component of the aircraft 100. For example, the flight controller computing platform 120 may be configured to generate command signal(s) that control the operation of an inverter (not shown) that provides electric energy to at least one motor 106 of the aircraft 100, an actuator (as further discussed below with reference to FIG. 2) that controls the operation of at least one control surface 114-118 of the aircraft 100, and/or the like. Examples of flight controller components include the flight controller components 206, as depicted in FIG. 2.

In some embodiments, a flight controller component (as further discussed below with reference to FIG. 2) of the flight controller computing platform 120 is configured to determine a command signal for controlling the operation of an aircraft component based on at least one of pilot input data provided by one or more pilot control devices (not shown) and/or sensor data provided by the sensor(s) 122.

At least one of the pilot control devices may be located in a cockpit 104 of the aircraft 100. The pilot control devices may be configured to detect a pilot action and transmit pilot input data representing an indication of the detected pilot control action (e.g., an electric signal encoding the detected action) to the flight controller computing platform 120. A pilot control device may include a throttle lever, an inceptor stick, a lift lever, a steering wheel, a brake pedal, a pedal control, a toggle, a joystick, a collective pitch control device, an alpha-numeric input device (e.g., a keyboard), a pointing device, an audio input device (e.g., a microphone, a voice response system, etc.), a cursor control device (e.g., a mouse), a touchpad, an optical scanner, a video capture device, a touchscreen, and/or the like. Example configurations for a pilot control device are described in U.S. Pat. No. 11,514,497, filed on Aug. 25, 2020 and entitled "Hover and Thrust Control Assembly for Dual-Mode Aircraft," which is incorporated by reference herein in its entirety and for all purposes.

In some embodiments, a flight controller component (as further discussed below with reference to FIG. 2) of the flight controller computing platform 120 is configured to: (i) receive pilot input data generated by a pilot control device, and (ii) determine, based at least in part on the received pilot input data, a command signal. The pilot input data may represent an indication of an action performed by the pilot in relation to the pilot control device, such as stick deflection data including an indication of a button pressed on a stick (e.g., an inceptor stick), lever position data including an indication of a position of a lever (e.g., throttle lever), pedal position data including an indication of a pedal (e.g., a rudder pedal), and/or the like. For example, the pilot input data may represent that the pilot has requested raising a rudder 116 of the aircraft by fifty percent via pressing a rudder pedal by a particular magnitude. As another example, the pilot input data may represent that the pilot has requested a 40 percent increase in the thrust of the aircraft 100 by moving the throttle lever to a particular position. The command signal may represent a pilot command determined based on the pilot input data. For example, the command signal may represent a determination that the pilot input data requires setting the position of a control surface actuator to a particular position. As another example, the command signal may represent a determination that the pilot input data requires setting a property (e.g., a voltage) of electric power load required by an inverter that provides electric power to a motor of the aircraft 100.

For example, a flight controller component (as further discussed below with reference to FIG. 2) of the flight controller computing platform 120 may receive pilot input data representing a detected position of a rudder pedal. Based on the received pilot input data representing the detected rudder pedal position, the flight controller component may detect a pilot request to set the positioning of an actuator associated with the right rudder 116A and/or the left rudder 116B to desired position(s). As another example, a flight controller component may receive pilot input data representing a detected position of a throttle lever. Based on the received pilot input data representing the detected throttle lever position, the flight controller component may detect a pilot request to command an inverter to provide electric power sufficient to cause a motor to produce a desired output torque In some embodiments, a flight controller component (as further discussed below with reference to FIG. 2) of the flight controller computing platform 120 may determine a command signal (e.g., configured to control the operation of the aircraft 100) based on factors in addition to and/or instead of the pilot input data. For example, the flight controller component may determine the command signal based at least in part on data generated by sensor(s) 122. In an example embodiment, if a flight controller component determines that a trajectory determined based on the command signal leads to a collision with an obstacle and/or leads to an undesirable environmental condition (e.g., an undesirable weather condition), the flight controller component may modify the command signal to correct the trajectory. Accordingly, in some embodiments, the flight controller computing platform 120 may enable autonomous and/or partially autonomous operation of the aircraft 100 (e.g., operation of the aircraft 100 at least partially independent of the pilot input). Example techniques for autonomous and/or partially autonomous operation of an aircraft are described in U.S. Pat. App. Pub. No. 2023/0019396, filed on Jul. 13, 2021 and entitled "Systems and Methods for Autonomous Flight Collision Avoidance in an Electric Aircraft," which is incorporated by reference herein in its entirety and for all purposes.

As described above, in some embodiments, the flight controller computing platform 120 may determine one or more command signals for controlling the aircraft 100 and/or a trajectory generated for the aircraft 100 based on sensor data provided by the sensor(s) 122. The sensor(s) 122 may include vision sensor(s), depth sensor(s) (e.g., lidar sensor(s)), torque sensor(s), gyroscope(s), accelerometer(s), magnetometer(s), inertial measurement unit(s) (IMU(s)), pressure sensor(s), force sensor(s), proximity sensor(s), displacement sensor(s), vibration sensor(s), environmental sensor(s), and/or the like.

A flight controller component (as further discussed below with reference to FIG. 2) used to determine a pilot command signal (e.g., based on pilot input data) may include a computing device. For example, the flight controller component may include a microprocessor, a digital signal processor (DSP), a system on a chip (SoC), a field-programmable gate array (FPGA), a complex programmable logic device (CPLD), an application specific integrated circuit (ASIC), a multi-chip module, a printed circuit board, and/or the like. In some embodiments, the flight controller component is configured to receive one or more pilot input signals from one or more pilot control devices, perform one or more signal processing operations (e.g., one or more time-frequency analysis operations) on the pilot control signal(s) to generate one or more transformed signals, and determine the command signal based on the transformed signal(s). For example, a flight controller component may be configured to perform a Fast Fourier Transform, a Short-time Fourier Transform, a Wavelet Transform, or other time-frequency analysis on at least one of the pilot input signal(s) to detect one or more signal attributes, and determine the transformed signal(s) based on the signal attribute(s). In some embodiments, the flight controller component may use one or more trained machine learning models to perform the signal processing operation(s) on at least one of the pilot control signal(s).

The command signal(s) generated by the flight controller computing platform 120 may indicate desired parameter(s)

for one or more components (e.g., one or more control surface actuators, one or more inverters, and/or the like) of the aircraft 100. A system associated with the aircraft (e.g., the flight controller computing platform 120, a command processor unit, and/or the like) may control the operation of one or more aircraft components based on the command signal(s). Example techniques for controlling the operation of one or more aircraft components based on command signal(s) generated by the flight controller computing platform 120 are described in greater detail below.

Figure 3:
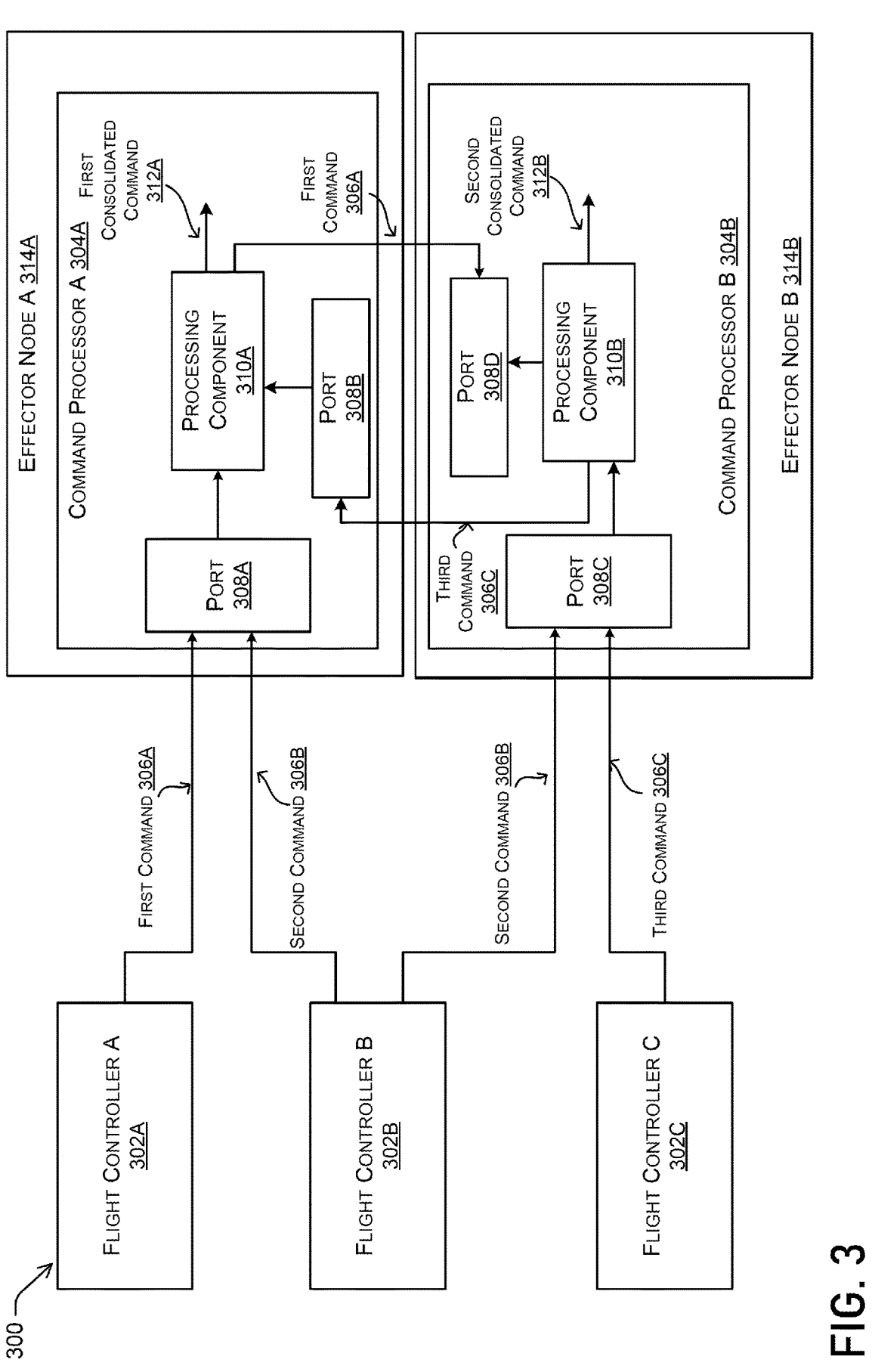
FIG. 3 provides an operational example of a configuration for controlling the operation of an aircraft component using two command processors.
Figure 4:
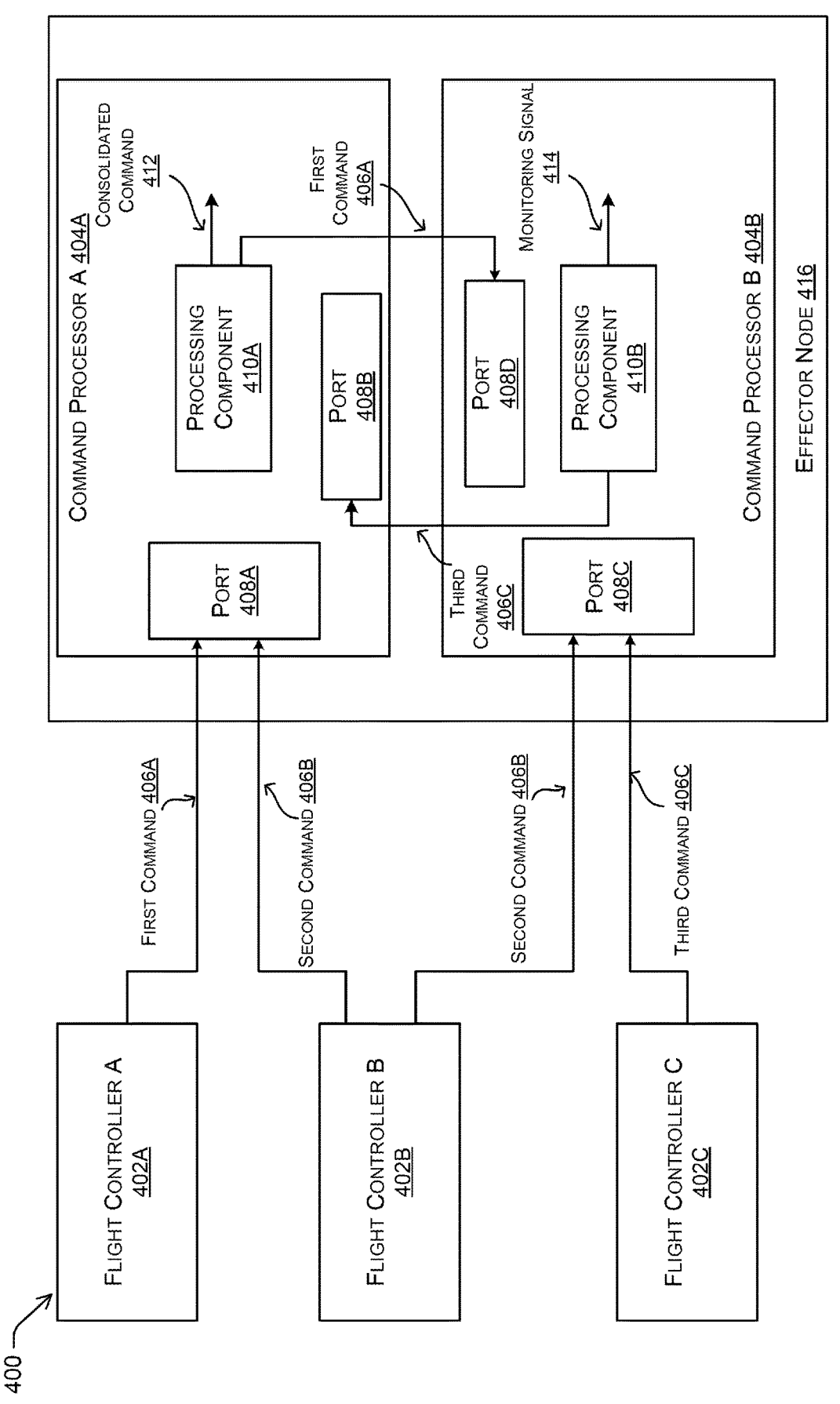
FIG. 4 provides a second operational example of a configuration for controlling the operation of an aircraft component using a first command processor monitored based on the output of a second command processor.

For example, in some embodiments, the flight controller computing platform 120 includes two or more flight controller components (e.g., two or more FCCs) that receive the same pilot input data associated with the same set of pilot control devices. Examples of flight controller components are described below with reference to FIG. 2. In some embodiments, the aircraft 100 includes a command processor (as further discussed below with reference to FIGS. 3-4) configured to: (i) receive at least a subset of the command signals generated by the two or more flight controller components, and (ii) determine, based on the received command signal(s), a consolidated command signal. The consolidated command signal may then be used to control the operation of the aircraft component. In some embodiments, the aircraft 100 includes two or more command processors that are configured to receive command signals generated by the same set of flight controller components and determine respective consolidated command signals based on the common set of command signals. Examples of command signals include signals 306 as depicted in FIG. 3 and signals 406 as depicted in FIG. 4.

Accordingly, in some embodiments, the flight controller computing platform 120 includes two or more flight controller components (as further discussed below with reference to FIG. 2) that receive the same pilot input data associated with the same set of pilot control devices. Each of the noted flight controller components may be configured to process the pilot input data to determine a command signal that may be the same as or different from the pilot control signal determined by another one of the flight controller components. For example, the flight controller computing platform 120 may include a first flight controller component FCC1 configured to receive pilot input data generated by a first pilot control device (e.g., a device used to request adjustment of pitch, roll, and/or yaw of the aircraft 100; a device used to request a particular thrust level such as a thrust lever; and/or the like) to generate a first command signal C1, a second flight controller component FCC2 configured to receive pilot input data generated by the first pilot control device to generate a second command signal C2, and a third flight controller component FCC3 configured to receive pilot input data generated by the first pilot control device to generate a third command signal C3. In this example, C1 may be the same as or different from C2 and C3, even though C1-C3 are determined based on the same pilot input data. For example, in some embodiments, C1 may be different from C2 and C3 if at least one of FCCs 1-3 is experiencing failure, is operating erroneously, and/or is operating sub-optimally. In some embodiments, a flight controller component may generate an erroneous command signal due a wire oxidation in one or more wires associated with the buses (as further discussed below with reference to FIG. 2) of the aircraft, one or more environmental conditions that cause data loss and/or data manipulation before, during, and/or after transmission of pilot input data to the flight controller component, a failure of one or more communication ports (as further discussed below with reference to FIGS. 3-4) of the flight controller component, and/or the like.

Accordingly, in some embodiments, two or more flight controller components (as further discussed below with reference to FIG. 2) may be configured to determine command signals based on pilot input data associated with the same set of pilot control devices. This may provide redundancy in command signal determination and/or to decrease the latency associated with command signal determination based on pilot input. For example, in some embodiments, if two or more flight controller components are configured to determine command signals based on pilot input data associated with the same set of pilot control devices, the failure of a subset of those flight controller components is less likely to affect the operation of the aircraft 100, as other flight controller components may mitigate or take over the task of command signal determination despite the failure. As another example, in some embodiments, if two or more flight controller components are configured to determine command signals based on pilot input data associated with the same set of pilot control devices, then the two or more flight controller components may operate in parallel to determine command signals based on the pilot input data. In such embodiments, if a first subset of the two or more flight controller components is delayed in determining flight controller components, another subset of the two or more flight controller components may mitigate the effect of the delay by determining a command signal for controlling the aircraft component independent of the first subset's output.

For example, if N flight controller components (as further discussed below with reference to FIG. 2) are configured to determine command signals for controlling the operation of an aircraft component, then the system (e.g., the flight controller computing platform 120, a command processor associated with the component, and/or the like) may adjust the operation of the component if the system receives at least a threshold number of the N command signals generated by the N flight controller components.

In some embodiments, to control the operation of an aircraft component (e.g., a control surface actuator, an inverter, and/or the like) based on pilot control data generated by a set of pilot control devices, the flight controller computing platform 120 includes two or more flight controller components (as further discussed below with reference to FIG. 2) each configured to determine a command signal based on the pilot input data. In some of the described embodiments, the aircraft 100 also includes (e.g., as part of the flight controller computing platform 120, as part of the aircraft component, coupled to the aircraft component, as part of a separate command processor unit, and/or the like) a command processor (as further discussed below with reference to FIGS. 3-4) configured to: (i) receive at least a subset of the command signals generated by the two or more flight controller components, and (ii) determine, based on the received command signal(s), a consolidated command signal. The consolidated command signal may then be used to control the operation of the aircraft component. Examples of consolidated command signals include signals 312 as depicted in FIG. 3 and signal 412 as depicted in FIG. 4.

A command processor (as further discussed below with reference to FIGS. 3-4) may be a computing device configured to receive a set of command signals generated by a set of flight controller components and determine a consolidated command signal based on the set of command signals. A consolidated command signal may represent a parameter for controlling the operation of an aircraft component (e.g., an inverter output's voltage, a position of a control surface actuator, and/or the like) determined based on at least two command signals.

A command processor (as further discussed below with reference to FIGS. 3-4) may generate a consolidated command signal by aggregating two or more command signals generated by two or more flight controller components. Aggregating two or more command signals may include at least one of determining a measure of statistical distribution (e.g., a central tendency measure, such as a mean and/or a median) of two or more values associated with the command signals, determining which of the two or more command signals has the highest vote based on a distribution of the two or more command signals, and/or the like. Votes associated with command signals may be determined using one or more voting algorithms. Examples of voting algorithms are described in U.S. Pat. No. 11,225,321, filed on Mar. 31, 2021 and entitled "Method and System for Fly-by-Wire Flight Control Configured for Use in Electric Aircraft," which is incorporated by reference herein in its entirety and for all purposes.

In one example, if a first command signal is associated with raising an aileron by 40 percent, a second command signal is associated with raising the aileron by 50 percent, and a third command signal is associated with raising the aileron by 40 percent, a command processor may determine a consolidated command signal that is associated with raising the aileron by 43 percent, as the average of the percentage values indicated by the three command signals approximately equals 43. In another example, if a first command signal is associated with raising an aileron by 40 percent, a second command signal is associated with raising the aileron by 50 percent, and a third command signal is associated with raising the aileron by 40 percent, a command processor may determine a consolidated command signal that is associated with raising the aileron by 40 percent, as the median of the percentage values indicated by the three command signals is 40. In yet another example, if a first command signal is associated with raising an aileron by 40 percent, a second command signal is associated with raising the aileron by 50 percent, and a third command signal is associated with raising the aileron by 40 percent, a command processor may determine a consolidated command signal that is associated with raising the aileron by 40 percent, because the 40-percent increase may have a higher vote relative to the 50-percent increase.

In some embodiments, if each of N flight controller components (as further discussed below with reference to FIG. 2) is configured to receive pilot input data associated with a first aircraft component (e.g., an inverter, a control surface actuator, and/or the like) and determine a respective command signal, then each of M command processors is configured to receive at least a subset of (e.g., some or all of) the N command signals and determine a respective consolidated pilot command based on the received command signals.

For example, if N=3 command signals and M=2 command processors, a first flight controller component may be configured to receive the pilot input data and determine a first command signal. Additionally, a second flight controller component may be configured to receive the pilot input data and determine a second command signal. Furthermore, a third flight controller component may be configured to receive the pilot input data and determine a third command signal. Moreover, a first command processor may be configured to receive at least two (e.g., all three) of the first command signal, the second command signal, and the third command signal and determine a first consolidated command signal based on the received command signals. Furthermore, a second command processor may be configured to receive at least two (e.g., all three) of the first command signal, the second command signal, and the third command signal and determine a second consolidated command signal based on the received command signals.

Accordingly, in some embodiments, two or more (i.e., M>=2) command processors may be configured to receive the same set of command signals to determine respective consolidated command signals. This may enable more precise operational control, redundant operational control, faster and/or more responsive operational control, and/or more safeguarded operational control of a component of the aircraft 100. For example, in some embodiments, each of the two or more processor command processors may control one aspect of the operation of an aircraft component. In an example embodiment, a first command processor may generate a first consolidated command signal that controls a first portion of an electric power load required by an inverter while a second command processor may generate a second consolidated command signal that controls a second portion of the electric power load demanded by the same inverter.

As another example, in some embodiments, the flight controller computing platform 120 may validate the consolidated command signal(s) generated by a first subset of two or more command processors based on the consolidated command signal(s) generated by a second subset of the two or more command processors. If the flight controller computing platform 120 successfully validates the command signal(s) generated by the first subset, the flight controller computing platform 120 may use those validated command signal(s) to control the operation of an aircraft component. For example, a first command processor may determine a first consolidated command signal that represents a first actuator position for a control surface actuator. Likewise, a second command processor may determine a second consolidated command signal that represents a second actuator position for the same control surface actuator. And the flight controller computing platform 120 may use the first consolidated command signal to control the position of the control surface actuator if the deviation between the two positions falls below a threshold (e.g., a threshold of zero).

As another example, in some embodiments, flight controller computing platform 120 may control the operation of an aircraft based on the operational parameters represented by two or more consolidated command signals generated by two or more command processors. For example, a first command processor may determine a first consolidated command signal that represents a first actuator position for a control surface actuator. Likewise, a second command processor may determine a second consolidated command signal that represents a second actuator for the same control surface actuator. And the flight controller computing platform 120 may control the position of the control surface actuator based on a value determined by averaging the two actuator positions.

Accordingly, in some embodiments, and as described in more detail below, a command processor (as further described with reference to FIGS. 3-4) receives a set of command signals generated by a set of flight controller components and aggregates the command signals to generate a consolidated command signal (e.g., the signals 312 and the signal 412 in FIGS. 3-4 respectively). The consolidated command signal may then be used to (e.g., conditionally, in combination with another consolidated signal such as the signal 414 in FIG. 4, and/or the like) control the operation of an aircraft component.

In some embodiments, a command processor may receive a first subset of the received command signals from one or more flight controller components and a second subset of the received command signals from one or more other command processors. For example, three flight controller components may be configured to process the same pilot input data to generate three respective command signals. In this example, a first flight controller component of the three flight controller components may generate a first command signal and provide the first command signal to the first command processor. Additionally, a second flight controller component of the three flight controller components may generate a second command signal and provide the second command signal to the first command processor and the second command processor. Furthermore, a third flight controller component of the three flight controller components may generate a third command signal and provide the third command signal to the second command processor. Moreover, the first command processor may provide the first command signal to the second command processor. And the second command processor may provide the second command signal to the first command processor. This arrangement may ensure that both command processors ultimately have access to all of the three command signals generated by the three flight controller components.

Accordingly, to facilitate providing a set of N command signals, generated by N flight controller components, to M command processors, the aircraft 100 may include: (i) a set of controller-processor connections each between one of the N flight controller components and one of the M command processors, and (ii) a set of processor-processor connections each between two of the M command processors. Examples of controller-processor connections include the buses depicted in FIG. 2. In some embodiments, at least one of the N flight controller components is directly connected to a subset, but not all, of the M command processors. In some embodiments, each of the M command processors receives all of the N command signals, with some command signals received from a first subset (e.g., less than all) of the N flight controller components and other command signals received from a second subset (e.g., all) of the other (M−1) command processors. Example operations for generating consolidated command signals using two or more command processors are described below with reference to FIGS. 3-7.

●Example Aircraft Bus Architectures

As described above, controlling components of the aircraft 100 may involve communication between various aircraft components, such as between a set of inverters, a set of control surface actuators, and a set of flight controller components. FIG. 2 depicts an example network architecture of aircraft 100 that enables the flight controller computing platform 120 to communicate with aircraft components and perform operations to affect control. Such operations of the flight controller computing platform 120 may include generating command signals, generating consolidated command signals, and controlling the operation of one or more aircraft components based on command signals and/or consolidated command signals. The aircraft network architecture of FIG. 2 may in some embodiments connect: (i) control surface actuators and/or inverters to a bus system; and/or (ii) flight control controllers (e.g., FCCs).

In FIG. 2, a bus network 200 of the aircraft 100 includes three network buses: bus A 202A, bus B 202B, and bus C 202C. At least one of the twelve network buses may be a controller area network (CAN) bus. A CAN bus may use one or more conductive pathways, such as one or more copper wires and/or one or more fiber optic cables, for data transmission. For example, a CAN bus may include two conductive pathways, with a first conductive pathway having a voltage of 2.5V when recessive and 3.5V when dominant, and a second conductive pathway having a voltage of 2.5V when recessive and 1.5 when dominant. A CAN bus may use this differential voltage mechanism to represent dominant and recessive bit states associated with digital packet data. A CAN bus may be used for data transmission, as opposed to power transmission.

As depicted in FIG. 2, the bus network 200 includes a set of effector nodes 204 and a set of flight controller components 206. Each bus 202A-202C may facilitate communications associated with one or more effector nodes 204 and/or one or more flight controller components 206. An effector node may be an aircraft component that creates a physical effect based on a received control signal. For example, an effector node may be a control surface actuator that converts electric signals into mechanical motion to move control surfaces like ailerons 118A-118D, elevators 114A-114D, and rudders 116A-116. Another example of an effector node may be an inverter node that controls supply of electric power from an inverter to a motor, such any of motors 106A-106E respectively powering lift rotors 108A-D or push propeller 110. An inverter node may send a command to an inverter to supply sufficient electric power to a motor that causes the motor to operate with a desired motor torque. The inverter may use electric power stored on one or more batteries. A subset of the effector nodes depicted in FIG. 2 may connect to two buses each. For example, in the example of FIG. 2, effector node A 204A connects to buses 202A and 202B, effector node B 204B connects to buses 202A and 202C, and effector node C 204C connects to buses 202B and 202C. An effector node that connects to two buses may include a control surface actuator that converts electric signals into mechanical motion to move control surfaces, such as control surfaces 114-118. An effector node that connects to two buses may include two command processors, and each of those two command processors may connect to one bus. For example, an inverter node may include two command processors and/or connect to two network buses. An inverter node may be a computing device (e.g., a command processor) that controls at least an aspect of the operation of one or more inverters associated with an aircraft, such as the electric power supplied by the inverter(s) to one or motors of the aircraft. An example of an effector node that includes two command processors is the effector node 416 as depicted in FIG. 4.

As further depicted in FIG. 2, a subset of the effector nodes depicted in FIG. 2 connect to one bus each. For example, effector node D 204D connects to bus 202A, effector node E 204E connects to bus 202B, effector node F 204F connects to bus 202A, effector node G 204G connects to bus 202C, effector node H 204H connects to bus 202B, and effector node I 204I connects to bus 202C. An effector node that connects to one bus may include one command processor that connects to the one bus. For example, an effector node associated with a control surface actuator may include one command processor and/or connect to one network bus. Examples of effector nodes that includes one command processor include effector nodes A-B 314A-B as depicted in FIG. 3. An effector node that connects to one bus may include an inverter.

In some embodiments, a pair of effector nodes that each connect to one bus may directly communicate with each other; for example, as effector node A 314A communicates with the effector node B 314B in FIG. 3. As depicted in FIG. 2, effector node D 204D connects to effector node E, effector node F 204F connects to effector node G 204G, and effector node H connects to effector node I 204I.

As further depicted in FIG. 2, each flight controller component 206 connects to two buses. For example, flight controller component A 206A connects to buses 202A-202B, flight controller component B 206B connects to buses 202A and 202B, and flight controller component C 206C connects to buses 202B-202C.

●Exemplary Flight Controller Configurations and Operations

FIG. 3 provides an operational example of a configuration 300 for controlling the operation of an aircraft component (e.g., an inverter of the aircraft 100, an actuator 204-208 of a control surface 114-118 of the aircraft 100, and/or the like) using two command processors A-B 304A-304B.

As depicted in FIG. 3, in accordance with the configuration 300, the flight controller component A 302A generates a first command signal 306A, the flight controller component B 302B generates a second command signal 306B, and the flight controller component C 302C generates a third command signal 306C. Command signals are described in further detail above with reference to FIG. 1.

In some embodiments, the flight controller components 302 generate their respective command signals based on the same set of pilot input data and/or using the same command signal determination routine(s). In some embodiments, at least one of the flight controller components 302 receives a set of pilot input data and/or uses a command signal determination routine different from the set of pilot input data received by and/or the command signal determination routine used by at least another of the flight controller components 302. For example, the flight controller component 302A may receive a set of pilot input data that is different from the set of pilot input data received by the flight controller component 302B and/or by the flight controller component 302C. As another example, the flight controller component 302A may use a command signal determination routine that is different from the command signal determination routine used by the flight controller component 302B and/or by the flight controller component 302C.

As further depicted in FIG. 3, the flight controller component 302A provides the first command signal 306A to the command processor A 304A of an effector node A 314A but not to the command processor B 304B of an effector node B 314B. The flight controller component 302B provides the second command signal 306B to both the command processor 304A and the command processor 304B. The flight controller component 302C provides the third command signal 306C to the command processor 304B, but not to the command processor 304A. Accordingly, at least one of the flight controller components 302 may provide the command signal generated by that flight controller component 302 to a subset, but not all, of the command processors 304 that ultimately receive the command signal.

As further depicted in FIG. 3, the command processor 304A provides the first command signal 306A to the command processor 304B, while the command processor 304B provides the third command signal 306C to the command processor 304A. In some embodiments, a first command processor forwards all of the command signals received by the first command processor to a second command processor. Accordingly, the command processor 304A may provide both the first command signal 306A and the second command signal 306B to the command processor 304B, while the command processor 304B may provide both the second command signal 306B and the third command signal 306C to the command processor 304A. In some embodiments, a first command processor forwards only those command signal that the first command processor determines (e.g., based on network architecture data accessible by the first command processor) to be unavailable to a second command processor to that second command processor. For example, the command processor 304A may send the first command signal 306A but not the second command signal 306B to the command processor 304B, based on the determination that the command processor 304B receives the second command signal 306B directly from the flight controller component 302B. As another example, the command processor 304B may send the third command signal 306C but not the second command signal 306B to the command processor 304A, based on the determination that the command processor 304A receives the second command signal 306B directly from the flight controller component 302B.

As further depicted in FIG. 3, the command processor 304A receives the first command signal 306A from the flight controller component 302A and the second command signal 306B from the flight controller component 302B. The command processor 304A may receive those two command signals using the communication port 308A. The communication port 308A may be configured to enable communications to and/or from a subset of the flight controller components that can directly communicate with the command processor 304A. The command processor 304A receives the third command signal 306C from the command processor B 304B using the communication port 308B. The communication port 308B may be configured to enable communications between the command processor 304A and one or more other command processors, such as the command processor 304B.

As further depicted in FIG. 3, the command processor 304B receives the second command signal 306B from the flight controller component 302B and the third command signal 306C from the flight controller component 302C. The command processor B 304B may receive those two command signals using the communication port 308C. The communication port 308C may be configured to enable communications to and/or from a subset of the flight controller components that can directly communicate with the command processor 304B. The command processor 304B receives the first command signal 306A from the command processor 304A using the communication port 308D. The communication port 308D may be configured to enable communications between the command processor 304B and one or more other command processors, such as the command processor 304A.

As further depicted in FIG. 3, the command processor 304A includes a processing component 310A that may process the first command signal 306A, the second command signal 306B, and the third command signal 306C to determine a first consolidated command signal 312A. For example, the processing component 310A may aggregate the first command signal 306A, the second command signal 306B, and the third command signal 306C to determine the first consolidated command signal 312A. Example techniques for aggregating a set of command signals to determine a consolidated command signal are described above with reference to FIG. 1. The processing component 310A may include a microprocessor, a DSP, an SoC, an FPGA, a CPLD, an ASIC, a multi-chip module, a printed circuit board, and/or the like.

As further depicted in FIG. 3, the command processor B 304B includes a processing component 310B that may process the first command signal 306A, the second command signal 306B, and the third command signal 306C to determine a second consolidated command signal 312B. For example, the processing component 310B may aggregate the first command signal 306A, the second command signal 306B, and the third command signal 306C to determine the second consolidated command signal 312B. Example techniques for aggregating a set of command signals to determine a consolidated command signal are described above with reference to FIG. 1. The processing component 310B may include a microprocessor, a DSP, an SoC, an FPGA, a CPLD, an ASIC, a multi-chip module, a printed circuit board, and/or the like.

The effector node 416 may be an effector node as described above with reference to FIG. 2. The effector node 416 may use the first consolidated command signal 312A and the second consolidated command signal 312B to control the operation of an aircraft component. For example, the effector node 416 may be an inverter node that is configured to control supply of electric power from an inverter to a motor 106 of the aircraft 100 based on the consolidated pilot command signals 312. As another example, the effector node 416 may be a control surface actuator that controls a desired position of a control surface 114-118 of the aircraft 100 based on the consolidated pilot command signals 312.

In some embodiments, the effector node 416 may use the first consolidated command signal 312A and the second consolidated command signal 312B to control the operation of two aircraft components (e.g., two related and/or companion aircraft components). For example, the effector node 416 may use the first consolidated command signal 312A to set a property (e.g., a voltage of the electric power load) of a first inverter and the second consolidated command signal 312B to set a property (e.g., a voltage) of a second inverter. Both inverters may provide electric power to the same set of motors 106 of the aircraft 100.

As another example, the effector node 416 may use the first consolidated command signal 312A to set a property (e.g., a desired position) of an actuator of a first control surface 114-118 and the second consolidated command signal 312B to set a property (e.g., a desired position) of an actuator of a second control surface 114-118. The two control surfaces 114-118 may be of the same kind (e.g., both be ailerons) and/or on the same side (e.g., both be on the left) of the aircraft.

For example, in some embodiments, the first consolidated command signal 312A and the second consolidated command signal 312B are used to control a left outboard elevator and a left inboard elevator, respectively. In some embodiments, the first consolidated command signal 312A and the second consolidated command signal 312B are used to control a right outboard elevator and a right inboard elevator, respectively. In some embodiments, the first consolidated command signal 312A and the second consolidated command signal 312B are used to control a left outboard aileron and a left inboard aileron, respectively. In some embodiments, the first consolidated command signal 312A and the second consolidated command signal 312B are used to control a right outboard aileron and a right inboard aileron, respectively.

FIG. 4 provides an operational example of a configuration 400 for controlling the operation of an aircraft component (e.g., an inverter of the aircraft 100, an actuator 204-208 of a control surface 114-118 of the aircraft 100, and/or the like) using a command processor A 404A (e.g., primary command processor) monitored based on the output of a command processor B 404B (e.g., a secondary command processor).

As depicted in FIG. 4, in accordance with the configuration 400, the flight controller component A 402A generates a first command signal 406A, the flight controller component B 402B generates a second command signal 406B, and the flight controller component C 402C generates a third command signal 406C. In some embodiments, the flight controller component 402A, the flight controller component 402B, and the flight controller component 402C perform at least some of the operations described above with reference to the flight controller component 302A, the flight controller component 302B, and the flight controller component 302C, respectively.

As further depicted in FIG. 4, the flight controller component 402A provides the first command signal 406A to the command processor 404A but not to the command processor 404B. The flight controller component 402B provides the second command signal 406B to both the command processor 404A and the command processor 404B. The flight controller component 402C provides the third command signal 406C to the command processor 404B, but not to the command processor 404A. Accordingly, at least one of the flight controller components 402 may provide the command signal generated by that flight controller component to a subset, but not all, of the command processors 404 that ultimately receive the command signal.

As further depicted in FIG. 4, the command processor 404A provides the first command signal 406A to the command processor 304B, while the command processor B 404B provides the third command signal 406C to the command processor 404A. The communication between the command processor 404A and the command processor 404B may include at least some of the communication between the command processor 304A and the command processor 304B described above. Communication ports 408A, 408B, 408C, and 408D may operate in a manner substantially similar to the communication ports 308A, 308B, 308C, and 308D respectively, as described above.

As further depicted in FIG. 4, the command processor 404A includes a processing component 410A configured to process the first command signal 406A, the second command signal 406B, and the third command signal 406C to determine a consolidated command signal 412. The processing component 410A may, for example, perform at least some of the operations of the processing component 310A.

As further depicted in FIG. 4, the command processor 404B includes a processing component 410B configured to process the first command signal 406A, the second command signal 406B, and the third command signal 406C to determine a monitoring signal 414. In some embodiments, the monitoring signal 414 may be a second consolidated command signal determined based on the first command signal 406A, the second command signal 406B, and the third command signal 406C, for example a second consolidated command signal determined in accordance with the operations described with reference to the command processor 304B above.

In some embodiments, the monitoring signal 414 may represent a measure of deviation between a second consolidated command signal determined by the command processor B 404B and the consolidated command signal 412. For example, the monitoring signal 414 may represent whether a deviation between the consolidated command signal 412 and the second the consolidated command signal (e.g., a deviation between two numeric values corresponding to the two consolidated command signals, such as two voltage values and/or desired actuator position values) exceeds a threshold. As another example, monitoring signal 414 may represent whether the consolidated command signal 412 and the second the consolidated command signal represent the same value (e.g., the same voltage value and/or desired actuator position value).

As further depicted in FIG. 4, the command processor 404A and the command processor 404B are parts (e.g., processors of) of an effector node 416. The effector node 416 may be a computing device configured to control the operation of an aircraft component (e.g., an inverter, a control surface actuator, and/or the like). In some embodiments, the effector node 416 is configured to control the operation of the aircraft component based at least in part on the consolidated command signal 412 and/or the monitoring signal 414. For example, the effector node 416 may be configured to control the operation of the aircraft component based on the consolidated command signal 412 if the monitoring signal 414 indicates that the consolidated command signal 412 is valid (e.g., if the monitoring signal 414 represents that the deviation between the consolidated command signal 412 and a consolidated command signal generated by the command processor B 404B falls below a threshold). In some embodiments, if the monitoring signal 414 indicates that the consolidated command signal 412 is not valid, the effector node 416 refrains from operating the aircraft component based on the consolidated command signal 412. For example, if the monitoring signal 414 indicates that the consolidated command signal 412 is not valid, the effector node 416 may control the operation of the aircraft component based on an automated trajectory, a backup trajectory, and/or a failsafe trajectory.

Accordingly, the effector node 416 may control the operation of an aircraft component based on the consolidated command signal 412 and/or the monitoring signal 414. For example, in some embodiments, if the effector node 416 determines that the monitoring signal 414 validates the consolidated command signal 412, the effector node 416 may adjust a property of (e.g., a voltage of the electric power load required by) an inverter that provides electric energy to a motor 106 of the aircraft 100 based on the consolidated command signal 412 (e.g., based on a numeric voltage value and/or a voltage level indicated by the consolidated command signal 412). As another example, in some embodiments, if the effector node 416 determines that the monitoring signal 414 validates the consolidated command signal 412, the effector node 416 may adjust a property (e.g., a desired position) of a control surface actuator that actuates a control surface 114-118 of the aircraft 100 based on the consolidated command signal 412 (e.g., based on a numeric position value and/or a position level indicated by the consolidated command signal 412).

Figure 5:
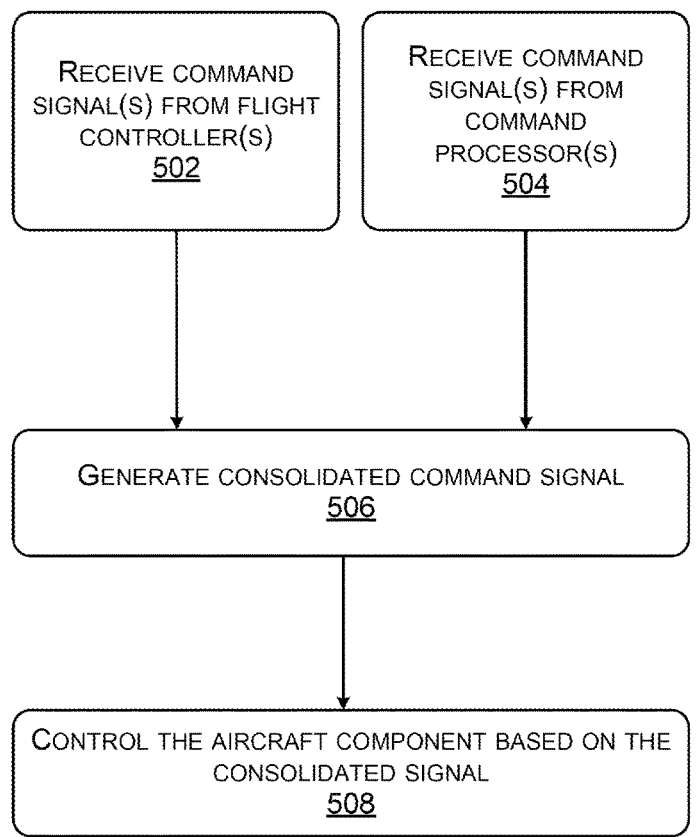
FIG. 5 is a flowchart depicting an example process for controlling an aircraft component using a command processor.

FIG. 5 is a flowchart diagram of an example process 500 for controlling an aircraft component using a command processor (e.g., at least one of the command processors 304 of FIG. 3, the command processor 404A of FIG. 4, and/or the like). As depicted in FIG. 5, at operation 502, the command processor receives one or more first command signals from one or more first flight controller components (e.g., at least one of the flight controller components 302 of FIG. 3 or at least one of the flight controller components 402 of FIG. 4). Each flight controller component may have previously determined a respective command signal based on pilot control input data captured by one or more pilot control devices (e.g., one or more pilot control devices in the cockpit 104 of the aircraft 100).

At operation 504, the command processor receives one or more second command signals from one or more other command processors (at least one of the command processors 304A-304B of FIG. 3, the command processor 404B of FIG. 4, and/or the like). The second command signal(s) may have been generated by the second flight controller component(s) (e.g., based on pilot control input data captured by the one or more pilot control devices). After generating the second command signal(s), the second flight controller component(s) may have provided the second command signal(s) to the other command processor(s). After receiving the second command signal(s) from the second flight controller component(s), the other command processor(s) may have provided (e.g., forwarded) the second command signal(s) to the command processor.

At operation 506, the command processor receives a consolidated command signal based on the first command signal(s) received at operation 502 and the second command signal(s) received at operation 506. In some embodiments, the command processor performs operation 506 based on the process 506A depicted in FIG. 6. In some embodiments, to determine consolidated command signal based on the first and the second command signal(s), the command processor aggregates the first and the second command signal(s). Example techniques for aggregating a set of command signals to determine a consolidated command signal are described above. Examples of consolidated command signals include the signals 312 as depicted in FIG. 3 and the signal 412 as depicted in FIG. 4.

At operation 508, the command processor controls the aircraft component based on the consolidated command signal determined at operation 506. In some embodiments, operation 508 may be performed in accordance with the process 508A depicted in FIG. 7. In some embodiments, the consolidated command signal represents an operational parameter of the aircraft component, such as a desired position of a control surface actuator or a voltage of an electric power load required by an inverter. In some embodiments, the command processor causes modification of the operation of the aircraft component based on the operational parameter represented by the consolidated command signal.

Figure 6:
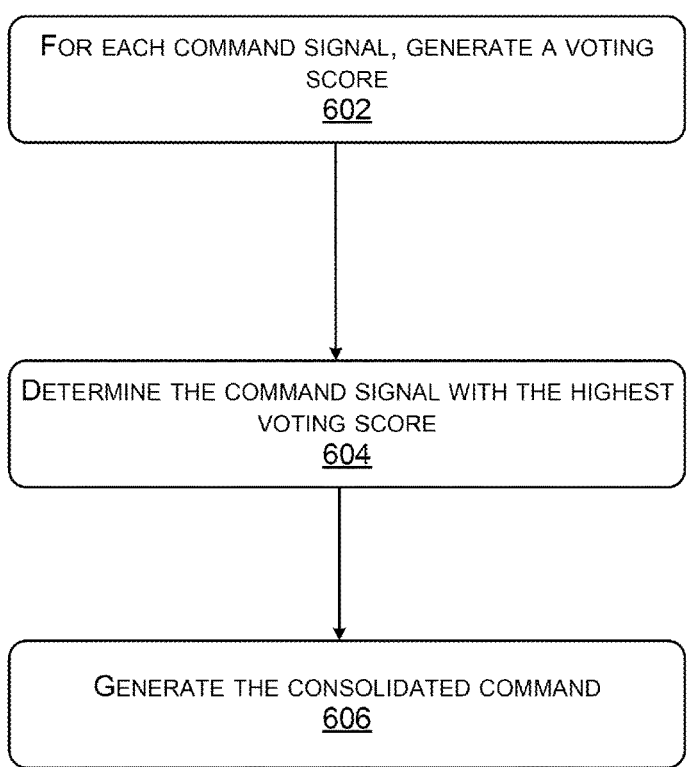
FIG. 6 is a flowchart depicting an example process for generating a consolidated command signal based on a set of command signals.

FIG. 6 is a flowchart diagram of an example process 506A for generating a consolidated command signal based on a set of command signals (e.g., the first command signal(s) received at operation 502 and the second command signal(s) received at operation 506 of the process 500 of FIG. 5). As depicted in FIG. 6, at operation 602, a command processor generates a voting score for each of the command signals. The voting score associated with a given command signal in a set of command signals represents an estimate of how much the distribution of the set confirms the accuracy of the given command signal.

For example, the voting score associated with a given command signal may represent how many of the command signals in the set have the same numeric value (e.g., voltage value, actuator position value, and/or the like) the same as and/or within a predefined range of the given command signal. As another example, the voting score associated with a given command signal may represent how far (e.g., how many standard deviations) the given command signal is from a central tendency measure (e.g., a mean) associated with a distribution determined based on the set of command signals. Example techniques for determining voting scores for command signals are described in U.S. Pat. No. 11,225, 321, filed on Mar. 31, 2021 and entitled "Method and System for Fly-by-Wire Flight Control Configured for Use in Electric Aircraft," which is incorporated by reference herein in its entirety and for all purposes.

At operation 604, the command processor determines the command signal with the highest voting score. In some embodiments, if two or more command signals have the highest voting score, the command processor selects one of the command signals using a selection heuristic (e.g., randomly selects one of the two or more highest-scoring command signals as the command signal with the highest voting score). In some embodiments, if two or more command signals have the highest voting score, the command processor determines the command signal with the highest voting score based on a measure of statistical distribution (e.g., a central tendency measure, such as a mean) of the two or more command signals.

At operation 606, the command processor generates the consolidated command signal based on the command signal determined at operation 604. In some embodiments, the command processor adopts the command signal determined at operation 604 as the consolidated command signal. In some embodiments, the command processor determines the consolidated command signal by making one or more adjustments to the command signal determined at operation 604, such as by one or more adjustments based on sensor data (e.g., one or more adjustments to avoid a detected obstacle and/or a detected environmental condition, such as a detected hazardous weather condition).

Figure 7:
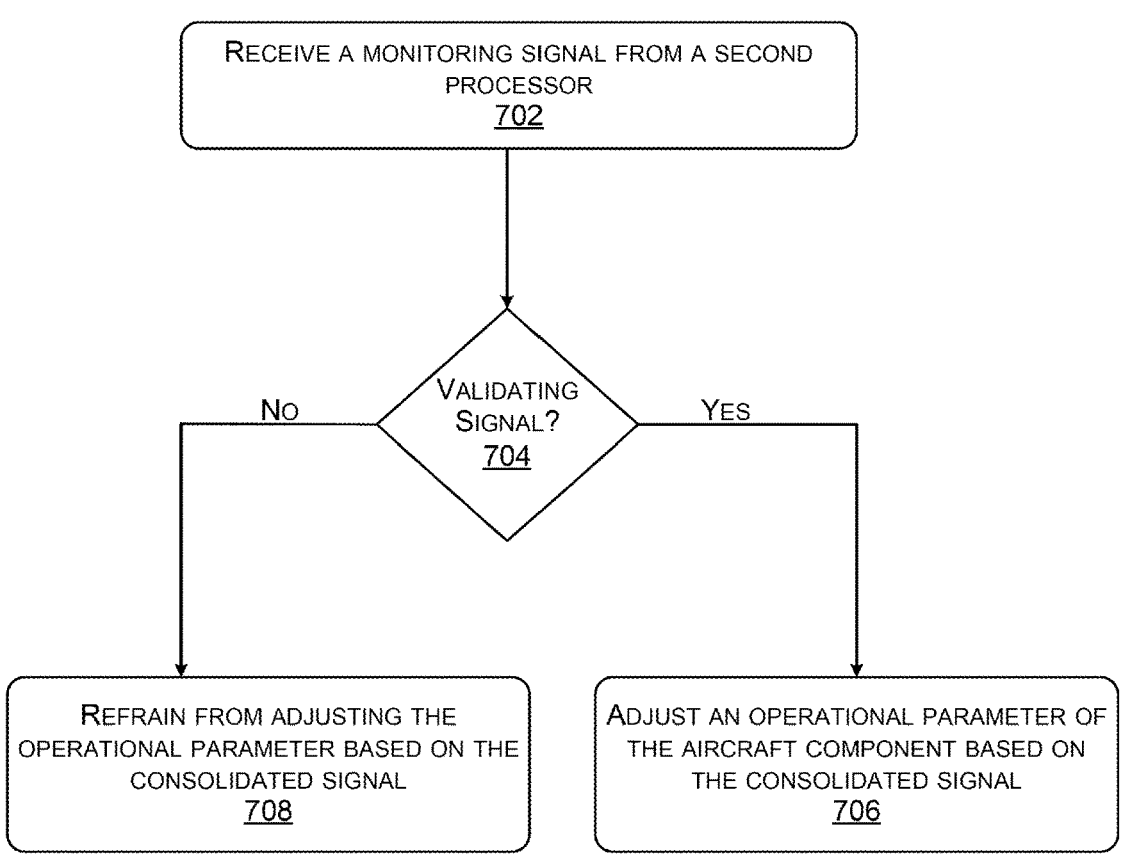
FIG. 7 is a flowchart depicting an example process for controlling an aircraft component based on a consolidated monitoring signal.

FIG. 7 is a flowchart diagram of an example process 508A for controlling an aircraft component based on a first consolidated monitoring signal (e.g., a consolidated monitoring signal determined at operation 506 of the process 500 of FIG. 5). As depicted in FIG. 7, at operation 702, the command processor receives a monitoring signal. The monitoring signal may represent a measure of deviation between the first consolidated monitoring signal and one or more other consolidated monitoring signals, such as one or more other consolidated monitoring signals determined based on the same set of command signals as the command signal(s) used to determine the first consolidated monitoring signal. Example features for monitoring signals are described in greater detail above.

At operation 704, the command processor determines whether the monitoring signal validates the first consolidated monitoring signal. For example, the monitoring signal may validate the first consolidated monitoring signal if the measure of deviation represented by the monitoring signal falls below a threshold. As another example, the monitoring signal may validate the first consolidated monitoring signal if the monitoring signal represents that the first consolidated monitoring signal is the same as and/or within a threshold range of one or more second consolidated monitoring signals.

If the command processor determines that the monitoring signal validates the first consolidated monitoring signal (704—Yes), the command processor proceeds to operation 706 to adjust an operational parameter of the aircraft component based on the first consolidated monitoring signal. For example, the command processor may adjust the torque of a motor via providing a command to an inverter and/or a position (e.g., a height) of a control surface actuator of an aircraft based on the first consolidated monitoring signal. Example techniques for controlling the operation of an aircraft component based on a consolidated monitoring signal are described in greater detail above.

If the command processor determines that the monitoring signal does not validate the first consolidated monitoring signal (704—No), the command processor proceeds to operation 708 to refrain from adjusting the operational parameter of the aircraft component based on the first consolidated monitoring signal. In some embodiments, if the monitoring signal indicates that the first consolidated command signal is not valid, the command processor may control the operation of the aircraft component based on an automated trajectory, a backup trajectory, and/or a failsafe trajectory.

●Exemplary Computing Device Architectures

Figure 8:
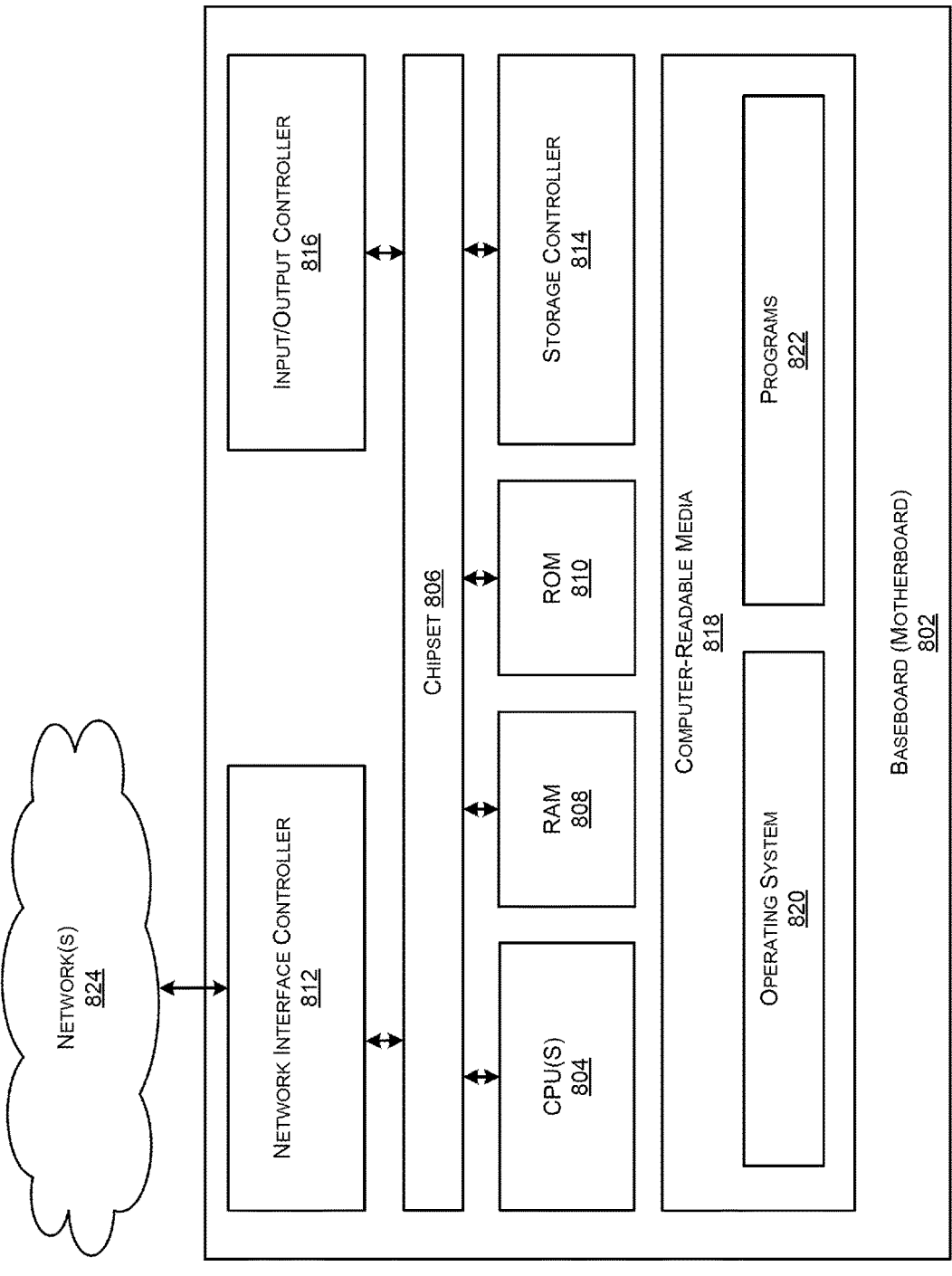
FIG. 8 shows an example computer architecture for a computing device capable of executing program components for implementing the functionality described herein.

FIG. 8 shows an example computer architecture for a computing device (or network routing device) 800 capable of executing program components for implementing the functionality described above (e.g., capable of executing program components for implementing the operation of a flight controller component and/or a command processor). The computer architecture shown in FIG. 8 illustrates a conventional server computer, workstation, desktop computer, laptop, tablet, network appliance, e-reader, smartphone, or other computing device, and can be utilized to execute any of the software components presented herein.

The computing device 800 includes a baseboard 802, or "motherboard," which is a printed circuit board to which a multitude of components or devices can be connected by way of a system bus or other electric communication paths. In one illustrative configuration, one or more central processing units ("CPUs") 804 operate in conjunction with a chipset 806. The CPUs 804 can be standard programmable processors that perform arithmetic and logical operations necessary for the operation of the computing device 800.

The CPUs 804 perform operations by transitioning from one discrete, physical state to the next through the manipulation of switching elements that differentiate between and change these states. Switching elements generally include electronic circuits that maintain one of two binary states, such as flip-flops, and electronic circuits that provide an output state based on the logical combination of the states of one or more other switching elements, such as logic gates. These basic switching elements can be combined to create more complex logic circuits, including registers, adders-subtractors, arithmetic logic units, floating-point units, and the like.

The chipset 806 provides an interface between the CPUs 804 and the remainder of the components and devices on the baseboard 802. The chipset 806 can provide an interface to a RAM 808, used as the main memory in the computing device 800. The chipset 806 can further provide an interface to a computer-readable storage medium such as a read-only memory ("ROM") 810 or non-volatile RAM ("NVRAM") for storing basic routines that help to start up the computing device 800 and to transfer information between the various components and devices. The ROM 810 or NVRAM can also store other software components necessary for the operation of the computing device 800 in accordance with the configurations described herein.

The computing device 800 can operate in a networked environment using logical connections to remote computing devices and computer systems through a network 824. The chipset 806 can include functionality for providing network connectivity through a network interface controller (NIC) 812, such as a gigabit Ethernet adapter. The NIC 812 is capable of connecting the computing device 800 to other computing devices over the network. It should be appreciated that multiple NICs 812 can be present in the computing device 800, connecting the computer to other types of networks and remote computer systems.

The computing device 800 can be connected to a storage device 818 that provides non-volatile storage for the computing device 800. The storage device 818 can store an operating system 820, programs 822, and data, which have been described in greater detail herein. The storage device 818 can be connected to the computing device 800 through a storage controller 814 connected to the chipset 806. The storage device 818 can consist of one or more physical storage units. The storage controller 814 can interface with the physical storage units through a serial attached SCSI ("SAS") interface, a serial advanced technology attachment ("SATA") interface, a fiber channel ("FC") interface, or other type of interface for physically connecting and transferring data between computers and physical storage units.

The computing device 800 can store data on the storage device 818 by transforming the physical state of the physical storage units to reflect the information being stored. The specific transformation of physical state can depend on various factors, in different embodiments of this description. Examples of such factors can include, but are not limited to, the technology used to implement the physical storage units, whether the storage device 818 is characterized as primary or secondary storage, and the like.

For example, the computing device 800 can store information to the storage device 818 by issuing instructions through the storage controller 814 to alter the magnetic characteristics of a particular location within a magnetic disk drive unit, the reflective or refractive characteristics of a particular location in an optical storage unit, or the electric characteristics of a particular capacitor, transistor, or other discrete component in a solid-state storage unit. Other transformations of physical media are possible without departing from the scope and spirit of the present description, with the foregoing examples provided only to facilitate this description. The computing device 800 can further read information from the storage device 818 by detecting the physical states or characteristics of one or more particular locations within the physical storage units.

In addition to the mass storage device 818 described above, the computing device 800 can have access to other computer-readable storage media to store and retrieve information, such as program modules, data structures, or other data. It should be appreciated by those skilled in the art that computer-readable storage media is any available media that provides for the non-transitory storage of data and that can be accessed by the computing device 800. In some examples, the operations performed by a network, and/or any components included therein (e.g., a router, such as an edge router), may be supported by one or more devices similar to computing device 800. Stated otherwise, some or all of the operations performed by the network, and or any components included therein, may be performed by one or more computing device 800 operating in a cloud-based arrangement.

By way of example, and not limitation, computer-readable storage media can include volatile and non-volatile, removable and non-removable media implemented in any method or technology. Computer-readable storage media includes, but is not limited to, RAM, ROM, erasable programmable ROM ("EPROM"), electrically-erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage or other magnetic storage devices, or any other medium that can be used to store the desired information in a non-transitory fashion.

As mentioned briefly above, the storage device 818 can store an operating system 820 utilized to control the operation of the computing device 800. According to one embodiment, the operating system comprises the LINUX operating system. According to another embodiment, the operating system comprises the WINDOWS® SERVER operating system from MICROSOFT Corporation of Redmond, Washington. According to further embodiments, the operating system can comprise the UNIX operating system or one of its variants. It should be appreciated that other operating systems can also be utilized. The storage device 818 can store other system or application programs and data utilized by the computing device 800.

In one embodiment, the storage device 818 or other computer-readable storage media is encoded with computer-executable instructions which, when loaded into the computing device 800, transform the computer from a general-purpose computing system into a special-purpose computer capable of implementing the embodiments described herein. These computer-executable instructions transform the computing device 800 by specifying how the CPUs 804 transition between states, as described above. According to one embodiment, the computing device 800 has access to computer-readable storage media storing computer-executable instructions which, when executed by the computing device 800, perform the various processes described above with regard to FIGS. 3-7. The computing device 800 can also include computer-readable storage media having instructions stored thereupon for performing any of the other computer-implemented operations described herein.

The computing device 800 can also include one or more input/output controllers 816 for receiving and processing input from a number of input devices, such as a keyboard, a mouse, a touchpad, a touch screen, an electronic stylus, or other type of input device. Similarly, an input/output controller 816 can provide output to a display, such as a computer monitor, a flat-panel display, a digital projector, a printer, or other type of output device. It will be appreciated that the computing device 800 might not include all of the components shown in FIG. 8, can include other components that are not explicitly shown in FIG. 8, or might utilize an architecture completely different than that shown in FIG. 8.

The computing device 800 may support a virtualization layer, such as one or more components associated with a computing resource network. The virtualization layer may provide virtual machines or containers that abstract the underlying hardware resources and enable multiple operating systems or applications to run simultaneously on the same physical machine. The virtualization layer may also include components for managing the virtualized resources, such as a hypervisor or virtual machine manager, and may provide network virtualization capabilities, such as virtual switches, routers, or firewalls. By enabling the sharing and efficient utilization of physical resources, virtualization can help reduce costs, simplify management, and increase flexibility in deploying and scaling computing workloads. The computing device 800 may also support other software layers, such as middleware, application frameworks, or databases, that provide additional abstraction and services to application developers and users. In some embodiments, the computing device 800 may provide a flexible and scalable platform for hosting diverse workloads and applications, from simple web services to complex data analytics and machine learning tasks.

Conclusion

Techniques described herein may include using a command processor to process a set of command signals to generate a consolidated command signal. The command processor may receive a first set of the processed command signals from one or more flight controller components and a second set from one or more second command processor. A flight controller component may determine a command signal based on pilot input data received from one or more pilot control devices and provide the determined to signal to a subset, but not all, of command processors used to control an aircraft component. Therefore, the techniques described herein may enable a command processor to process command signals received from flight controller component(s) and other command processor(s) to determine a consolidated command signal.

This arrangement may be advantageous because it reduces the number of communication links and associated hardware (e.g., cables, wiring harnesses, mounting hardware, etc.) needed to enable the operation of multiple command processors. This may reduce the weight of the aircraft; enhance the thrust, lift, and/or other operational capacity of the aircraft; and/or reduce power consumption by the flight control system, conserving battery power and increasing the range of the aircraft. In some instances, the reduced hardware may save cost for onboard electronics and, in turn, the overall cost to manufacture the aircraft.

While one or more examples of the techniques described herein have been described, various alterations, additions, permutations, and equivalents thereof are included within the scope of the techniques described herein. As can be understood, the components discussed herein are described as divided for illustrative purposes. However, the operations performed by the various components can be combined or performed in any other component. It should also be understood that components or steps discussed with respect to one example or implementation may be used in conjunction with components or steps of other examples. For example, the components and instructions of FIG. 8 may utilize the processes and flows of FIGS. 3-7.

In the description of examples, reference is made to the accompanying drawings that form a part hereof, which show by way of illustration specific examples of the claimed subject matter. It is to be understood that other examples can be used and that changes or alterations, such as structural changes, can be made. Such examples, changes or alterations are not necessarily departures from the scope with respect to the intended claimed subject matter. While the steps herein may be presented in a certain order, in some cases the ordering may be changed so that certain inputs are provided at different times or in a different order without changing the function of the systems and methods described. The disclosed procedures could also be executed in different orders. Additionally, various computations that are herein need not be performed in the order disclosed, and other examples using alternative orderings of the computations could be readily implemented. In addition to being reordered, the computations could also be decomposed into sub-computations with the same results.

Example Clauses

While the example clauses described below are described with respect to one particular implementation, it should be understood that, in the context of this document, the content of the example clauses can also be implemented via a method, device, system, computer-readable medium, and/or another implementation. Additionally, any of examples A-X may be implemented alone or in combination with any other one or more of the examples A-X.

A: A flight control system for an aircraft, the system comprising: a first flight controller configured to: receive a pilot control input to one or more pilot control devices of the aircraft, and generate, based on the pilot control input, a first command signal for controlling a first component of the aircraft; and a first command processor configured to: receive the first command signal from a first flight controller; receive, from a second processor, a second command signal for controlling the first component, the second command signal generated by a second flight controller based on the pilot control input; and generate, based on the first command signal and the second command signal, a consolidated command signal to control the first component of the aircraft.

B: The flight control system of paragraph A, wherein: the first command processor is further configured to receive a third command signal for controlling the first component from a third flight controller, the third command signal generated by the third flight controller based on the pilot control input, and generating the consolidated command signal is further based on the third command signal.

C: The flight control system of paragraph A or B, wherein: the first component comprises a motor associated with the aircraft, the first command processor is configured to adjust power supplied to the motor using a first inverter and based on the consolidated command signal, and the second processor is configured to adjust power supplied to the motor using a second inverter and based on a second consolidated command signal.

D: The flight control system of any of paragraphs A-C, wherein: the second processor is configured to generate a monitoring signal; and the first command processor is configured to: determine whether the monitoring signal permits controlling the first component based on the consolidated command signal, and based on determining that the monitoring signal permits controlling the first component based on the consolidated command signal, controlling the first component based on the consolidated command signal.

E: The flight control system of paragraph D, wherein generating the monitoring signal comprises: receiving the first command signal and the consolidated command signal from the first command processor; receiving the second command signal from the second flight controller; generating a second consolidated command signal based on the first command signal and the second command signal; and generating the monitoring signal based on a comparison of the consolidated command signal and the second consolidated command signal.

F: The flight control system of any of paragraphs A-E, wherein the first component is an actuator configured to actuate a control surface of the aircraft.

G: The flight control system of any of paragraphs A-F, wherein the first command processor is further configured to transmit the first command signal to the second processor.

H: The flight control system of paragraph G, wherein the system comprises the second processor, and wherein the second processor is configured to: receive the second command signal from the second flight controller; receive the first command signal from the first command processor; and generate a second consolidated command signal for controlling the first component based on the first command signal and the second command signal.

I: The flight control system of any of paragraphs A-H, wherein generating the consolidated command signal comprises: receiving a plurality of command signals comprising the first command signal and the second command signal; for each respective command signal of the plurality of command signals, determining a voting score based on a share of the plurality of command signals that confirm the respective command signal; and determining the consolidated command signal based on a highest voting score associated with the plurality of command signals.

J: The flight control system of any of paragraphs A-I, wherein generating the consolidated command signal comprises: receiving a plurality of command signals comprising the first command signal and the second command signal; determining a central tendency measure associated with the plurality of command signals; and generating the consolidated command signal based on the central tendency measure.

K: The flight control system of any of paragraphs A-J, wherein the first command processor is not directly connected to the second flight controller via a controller area network bus.

L: The flight control system of any of paragraphs A-K, wherein the aircraft comprises twelve controller area network busses and the first command processor is directly connected to only eight of the twelve controller area network busses.

M: The flight control system of any of paragraphs A-L, wherein: the first command processor is directly connected to the first flight controller, and the second processor is directly connected to the second flight controller.

N: A flight control system for an aircraft, the system comprising: a first command processor configured to: receive, from a first flight controller, a first command signal for controlling a first component of the aircraft, the first command signal generated based on pilot control input to one or more pilot control devices of the aircraft; receive, from a second flight controller, a second command signal for controlling the first component, the second command signal generated based on the pilot control input; receive, from a second processor, a third command signal for controlling the first component, the third command signal generated based on the pilot control input; and generate, based on the first through third command signals, a consolidated command signal to control the first component of the aircraft; and the second processor configured to: receive the third command signal from a second flight controller; and provide the third command signal to the first command processor to enable the first command processor to generate the consolidated command signal based on the first through third command signals.

O: The flight control system of paragraph N, wherein: the first component comprises a motor associated with the aircraft, the first command processor is configured to adjust power supplied to the motor using a first inverter and based on the consolidated command signal, and the second processor is configured to adjust power supplied to the motor using a second inverter and based on a second consolidated command signal.

P: The flight control system of paragraph N or O, wherein: the second processor is configured to generate a monitoring signal; and the first command processor is configured to: determine whether the monitoring signal permits controlling the first component based on the consolidated command signal, and based on determining that the monitoring signal permits controlling the first component based on the consolidated command signal, controlling the first component based on the consolidated command signal.

Q: The flight control system of paragraph P, wherein generating the monitoring signal comprises: receiving the first command signal and the consolidated command signal from the first command processor; receiving the second command signal from the second flight controller; generating a second consolidated command signal based on the first command signal and the second command signal; and generating the monitoring signal based on a comparison of the consolidated command signal and the second consolidated command signal.

R: The flight control system of any of paragraphs N-Q, wherein the second processor is configured to: receive the second command signal from the second flight controller; receive the first command signal from the first command processor; and generate a second consolidated command signal for controlling the first component based on the first command signal and the second command signal.

S: A command processor for an aircraft flight control system, the command processor comprising: a first connection port receiving: from a first flight controller, a first command signal for controlling a first component of an aircraft, the first command signal generated based on pilot control input to one or more pilot control devices of the aircraft; and from a second flight controller, a second command signal for controlling the first component, the second command signal generated based on the pilot control input; a second connection port receiving, from a second processor, a third command signal for controlling the first component, the third command signal generated based on the pilot control input; and a processing component configured to generate, based on the first through third command signals, a consolidated command signal to control the first component of the aircraft.

T: The command processor of paragraph S, wherein: the first connection port is connected to a first controller area network (CAN) bus of the aircraft, the second connection port is connected to a second CAN bus of the aircraft, and the command processor further comprises a third connection port receiving the third command signal from a third flight controller.

U: The command processor of paragraph T, wherein the first CAN bus is associated with a first region of the aircraft and the second CAN bus is associated with a second region of the aircraft.

V: The command processor of any of paragraphs S-U, wherein: the first component comprises a motor associated with the aircraft, the command processor is configured to adjust power supplied to the motor using a first inverter and based on the consolidated command signal, and the second processor is configured to adjust power supplied to the motor using a second inverter and based on a second consolidated command signal.

W: The command processor of any of paragraphs S-V, wherein: the second processor is configured to generate a monitoring signal; and the command processor is configured to: determine whether the monitoring signal permits controlling the first component based on the consolidated pilot command signal, and based on determining that the monitoring signal permits controlling the first component based on the consolidated pilot command signal, controlling the first component based on the consolidated pilot command signal.

X: The command processor of any of paragraphs S-W, wherein: controlling the first component based on the consolidated command signal comprises controlling a first actuator associated with a first control surface based on the consolidated command signal, the second command processor is configured to generate a second consolidated command signal for controlling a second actuator associated with a second control surface, a third flight controller is configured to generate the third command signal and provide the third command signal to the command processor, and the command processor is configured to provide the third command signal to the second command processor.

What is claimed is:

1. A flight control system for an aircraft, the flight control system comprising:

a set of flight controllers comprising a first flight controller and a second flight controller, the first flight controller being configured to:

receive a pilot control input to one or more pilot control devices of the aircraft, and generate, based on the pilot control input, a first command signal for controlling a first component of the aircraft; and a first command processor configured to:

receive, from a first subset of the set of flight controllers, a first set of command signals, wherein:

the first subset comprises a first plurality of flight controllers, the first plurality of flight controllers comprises the first flight controller and excludes the second flight controller, and the first set of command signals comprises the first command signal generated by the first flight controller and excludes a second command signal generated by the second flight controller based on the pilot control input;

receive, from a second command processor, the second command signal; and generate, based on aggregating the first set of command signals and the second command signal, a consolidated command signal to control the first component of the aircraft, wherein the second command processor is configured to:

receive a second set of command signals received from a second subset of the set of flight controllers, wherein:

the second subset comprises a second plurality of flight controllers, the second plurality of flight controllers comprises the second flight controller and excludes the first flight controller, and the second set of command signals comprises the second command signal and excludes the first command signal;

receive the first command signal from the first command processor;

generate at least one of a second consolidated command signal or a monitoring signal based on aggregating the second set of command signals and the second command signal; and provide the second command signal to the first command processor.

2. The flight control system of claim 1, wherein:

the first command processor is further configured to receive a third command signal for controlling the first component from a third flight controller, the third command signal generated by the third flight controller based on the pilot control input, and generating the consolidated command signal is further based on the third command signal.

3. The flight control system of claim 1, wherein:

the first component comprises a motor associated with the aircraft, the first command processor is configured to adjust power supplied to the motor using a first inverter and based on the consolidated command signal, and the second command processor is configured to generate the second consolidated command signal and adjust power supplied to the motor using a second inverter and based on the second consolidated command signal.

4. The flight control system of claim 1, wherein:

the second command processor is configured to generate the monitoring signal; and the first command processor is configured to:

determine whether the monitoring signal permits controlling the first component based on the consolidated command signal, and based on determining that the monitoring signal permits controlling the first component based on the consolidated command signal, controlling the first component based on the consolidated command signal.

5. The flight control system of claim 4, wherein generating the monitoring signal comprises:

receiving the first command signal and the consolidated command signal from the first command processor;

generating the second consolidated command signal based on the first command signal and the second set of command signals; and generating the monitoring signal based on a comparison of the consolidated command signal and the second consolidated command signal.

6. The flight control system of claim 1, wherein the first component is an actuator configured to actuate a control surface of the aircraft.

7. The flight control system of claim 1, wherein the first command processor is further configured to transmit the first command signal to the second command processor.

8. The flight control system of claim 7, wherein the flight control system comprises the second command processor, and wherein the second command processor is configured to:

receive the second command signal from the second flight controller;

receive the first command signal from the first command processor; and generate the second consolidated command signal for controlling the first component based on the first command signal and the second command signal.

9. The flight control system of claim 1, wherein generating the consolidated command signal comprises:

identifying a third set of command signals comprising the first set of command signals and the second command signal;

for each respective command signal of the third set of command signals, determining a voting score based on a share of the third set of command signals that confirm the respective command signal; and determining the consolidated command signal based on a highest voting score associated with the third set of command signals.

10. The flight control system of claim 1, wherein generating the consolidated command signal comprises:

receiving a plurality of command signals comprising the first command signal and the second command signal;

determining a central tendency measure associated with the plurality of command signals; and generating the consolidated command signal based on the central tendency measure.

11. The flight control system of claim 1, wherein the first command processor is not directly connected to the second flight controller via a controller area network bus.

12. The flight control system of claim 1, wherein the aircraft comprises twelve controller area network busses and the first command processor is directly connected to only eight of the twelve controller area network busses.

13. The flight control system of claim 1, wherein:
the first command processor is directly connected to the first flight controller, and the second command processor is directly connected to the second flight controller.

14. A flight control system for an aircraft, the flight control system comprising:
a first command processor configured to:
receive, from a first subset of a set of flight controllers, a first set of command signals, wherein:
the first subset comprises a first plurality of flight controllers,
the first plurality of flight controllers comprises a first flight controller of the set of flight controllers and excludes a second flight controller of the set of flight controllers, and
the first set of command signals comprises a first command signal for controlling a first component of the aircraft and excludes a second command signal for controlling the first component,
the first command signal is generated by the first flight controller based on pilot control input to one or more pilot control devices of the aircraft, and
the second command signal is generated by the second flight controller based on the pilot control input;
receive, from a second command processor, the second command signal for controlling the first component; and
generate, based on aggregating the first set of command signals and the second command signal, a consolidated command signal to control the first component of the aircraft; and
the second command processor configured to:
receive a second set of command signals from a second subset of the set of flight controllers, wherein:
the second subset comprises a second plurality of flight controllers,
the second plurality of flight controllers comprises the second flight controller and excludes the first flight controller, and
the second set of command signals comprises the second command signal and excludes the first command signal;
receive, from the first command processor, the first command signal;
generate, based on aggregating the second set of command signals and the first command signal, at least one of a second consolidated command signal or a monitoring signal; and
provide the second command signal to the first command processor to enable the first command processor to generate the consolidated command signal based on the first set of command signals and the second command signal.

15. The flight control system of claim 14, wherein:
the first component comprises a motor associated with the aircraft,
the first command processor is configured to adjust power supplied to the motor using a first inverter and based on the consolidated command signal, and
the second command processor is configured to generate the second consolidated command signal and adjust power supplied to the motor using a second inverter and based on the second consolidated command signal.

16. The flight control system of claim 14, wherein:
the second command processor is configured to generate the monitoring signal; and
the first command processor is configured to:
determine whether the monitoring signal permits controlling the first component based on the consolidated command signal, and
based on determining that the monitoring signal permits controlling the first component based on the consolidated command signal, controlling the first component based on the consolidated command signal.

17. The flight control system of claim 16, wherein generating the monitoring signal comprises:
receiving the first command signal and the consolidated command signal from the first command processor;
generating the second consolidated command signal based on the first command signal and the second set of command signals; and
generating the monitoring signal based on a comparison of the consolidated command signal and the second consolidated command signal.

18. The flight control system of claim 14, wherein the second command processor is configured to:
receive the first command signal from the first command processor; and
generate the second consolidated command signal for controlling the first component based on the first command signal and the second set of command signals.

19. A command processor for an aircraft flight control system, the command processor comprising:
a first connection port receiving:
from a first subset of a set of flight controllers, a first set of command signals for controlling a first component of an aircraft, wherein:
the first subset comprises a first plurality of flight controllers,
the first plurality of flight controllers comprises a first flight controller of the set of flight controllers and excludes a second flight controller of the set of flight controllers, and
the first set of command signals comprises a first command signal for controlling the first component and excludes a second command signal for controlling the first component,
the first command signal is generated by the first flight controller based on pilot control input to one or more pilot control devices of the aircraft, and
the second command signal is generated by the second flight controller based on the pilot control input; and
a second connection port receiving, from a second command processor, the second command signal, wherein the second command processor is configured to:
receive a second set of command signals received from a second subset of the set of flight controllers, wherein:
the second subset comprises a second plurality of flight controllers,
the second plurality of flight controllers comprises the second flight controller and excludes the first flight controller, and
the second set of command signals comprises the second command signal and excludes the first command signal;
receive the first command signal from the command processor;

generate at least one of a second consolidated command signal or a monitoring signal based on aggregating the second set of command signals and the second command signal; and provide the second command signal to the command processor; and a processing component configured to generate, based on aggregating the first set of command signals and the second command signal, a consolidated command signal for controlling the first component of the aircraft.

20. The command processor of claim 19, wherein:

the first connection port is connected to a first controller area network (CAN) bus of the aircraft, the second connection port is connected to a second CAN bus of the aircraft, and the second command processor further comprises a third connection port receiving a third command signal from a third flight controller.

21. The command processor of claim 20, wherein the first CAN bus is associated with a first region of the aircraft and the second CAN bus is associated with a second region of the aircraft.

22. The command processor of claim 19, wherein:

the first component comprises a motor associated with the aircraft, the command processor is configured to adjust power supplied to the motor using a first inverter and based on the consolidated command signal, and the second command processor is configured to generate the second consolidated command signal and adjust power supplied to the motor using a second inverter and based on the second consolidated command signal.

23. The command processor of claim 19, wherein:

the second command processor is configured to generate the monitoring signal; and the second command processor is configured to:

determine whether the monitoring signal permits controlling the first component based on the consolidated command signal, and based on determining that the monitoring signal permits controlling the first component based on the consolidated command signal, control the first component based on the consolidated command signal.

24. The command processor of claim 19, wherein:

controlling the first component based on the consolidated command signal comprises controlling a first actuator associated with a first control surface based on the consolidated command signal, the second command processor is configured to generate the second consolidated command signal for controlling a second actuator associated with a second control surface, a third flight controller is configured to generate a third command signal and provide the third command signal to the command processor, and the command processor is configured to provide the third command signal to the second command processor.

\* \* \* \* \*